United States Patent
Chang et al.

(10) Patent No.: US 11,490,099 B2
(45) Date of Patent: Nov. 1, 2022

(54) REFERENCE SUBPICTURE SCALING RATIOS FOR SUBPICTURES IN VIDEO CODING

(71) Applicant: QUALCOMM Incorporated, San Diego, CA (US)

(72) Inventors: Yao-Jen Chang, San Diego, CA (US); Vadim Seregin, San Diego, CA (US); Muhammed Zeyd Coban, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/125,225

(22) Filed: Dec. 17, 2020

(65) Prior Publication Data

US 2021/0195223 A1 Jun. 24, 2021

Related U.S. Application Data

(60) Provisional application No. 62/954,273, filed on Dec. 27, 2019, provisional application No. 62/953,015, filed on Dec. 23, 2019.

(51) Int. Cl.
| | |
|---|---|
| *H04N 19/187* | (2014.01) |
| *H04N 19/176* | (2014.01) |
| *H04N 19/172* | (2014.01) |
| *H04N 19/70* | (2014.01) |
| *H04N 19/51* | (2014.01) |
| *H04N 19/137* | (2014.01) |

(52) U.S. Cl.
CPC ......... *H04N 19/187* (2014.11); *H04N 19/137* (2014.11); *H04N 19/172* (2014.11); *H04N 19/176* (2014.11); *H04N 19/51* (2014.11); *H04N 19/70* (2014.11)

(58) Field of Classification Search
CPC .......................... H04N 19/187; H04N 19/137
See application file for complete search history.

(56) References Cited

U.S. PATENT DOCUMENTS

2014/0093179 A1* 4/2014 Deshpande ............ H04N 19/17
382/233

OTHER PUBLICATIONS

Chang Y-J., et al., "AhG12: On the Subpicture-Based Scaling Process," JVET-Q0333, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-9.

(Continued)

*Primary Examiner* — Jerry T Jean Baptiste
(74) *Attorney, Agent, or Firm* — Shumaker & Sieffert, P.A.

(57) ABSTRACT

A video decoder can be configured to determine that a first subpicture of a current picture has associated scaling parameters; receive the associated scaling parameters for the first subpicture of the current picture in response to determining that the first subpicture of the current picture has the associated scaling parameters; determine motion information, for a block of the first subpicture of the current picture, that identifies a subpicture of a reference picture; locate a prediction block for the block of the first subpicture of the current picture in the subpicture of the reference picture; and scale the prediction block based on the associated scaling parameters for the first subpicture of the current picture.

30 Claims, 12 Drawing Sheets

(56) References Cited

OTHER PUBLICATIONS

Chang Y-J., et al., "AhG8: Constraints on the Picture Scaling Ratios," JVET-Q0331, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-4.
Chang Y-J., et al., "AhG8/AhG12: On the Reference Picture Resampling for the Subpictures," JVET-Q0334, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-10.
Chen J., et al., "Algorithm Description of Joint Exploration Test Model 1," 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Pettersson M., et al., "AHG14: Normative Recovery Point Indication," JVET-M0529-v1, Joint Video Experts Team (JVET) of ITU-T SG 16 WP 3 and ISO/IEC JTC 1/SC 29/WG 11, 14th Meeting, Marrakesh, MA, Jan. 9-18, 2019, pp. 1-8.
Seregin V., et al., "AHG12: On Motion Compensation for Sub-Pictures," JVET-Q0157, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.
Hannuksela (Nokia) M.M, et al., "AHG8/AHG12: Subpicture-Specific Reference Picture Resampling," 16, JVET Meeting, Oct. 1, 2019-Oct. 11, 2019, Geneva, (The Joint Video Exploration Team of ISO/IEC JTC1/SC29/WG11 and ITU-T SG.16), No. JVET-P0403, m50370, Oct. 3, 2019 (Oct. 3, 2019), XP030217209, 3 pages, Retrieved from the Internet: URL: http://phenix.int-evry.fr/jvet/doc_end_user/documents/16_Geneva/wg11/JVET-P0403-v2.zip JVET-P0403-v2.docx [retrieved on Oct. 3, 2019].
International Search Report and Written Opinion—PCT/US2020/065875—ISA/EPO—dated Mar. 1, 2021—17 Pages.
Mitsuhiro (Sony) H, et al., "AHG8/AHG12 Subpicture-Based Reference Picture Resampling Signaling," 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0232 ; m51824, Dec. 30, 2019 (Dec. 30, 2019), XP030222942, 6 pages, Retrieved from the Internet: URL: http://phenix.int-evry.fr/jvet/doc_end_user/documents/17_Brussels/wg11/JVET-Q0232-v1.zip JVET-Q0232_SubpictureRPR-v1.docx [retrieved on Dec. 30, 2019].
Seregin (Qualcomm) V, et al., "AHG8: Scaling Window for Scaling Ratio Derivation," 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P0590, m50563 Oct. 10, 2019 (Oct. 10, 2019), XP030217789, 5 pages, Retrieved from the Internet: URL: http://phenix.int-evry.fr/jvet/doc_end_user/documents/16_Geneva/wg11/JVET-P0590-v3.zip JVET-P0590-v3.docx [retrieved on Oct. 10, 2019].
Y-J Chang (Qualcomm), et al., "AHG8: On Scaling Window Constraint," 131. MPEG Meeting, Jun. 29, 2020-Jul. 3, 2020, Online; (Motion Picture Expert Group or ISO/IEC JTC1/SC29/WG11), No. m54112, JVET-S0126, May 28, 2020 (May 28, 2020), XP030289749, Retrieved from the Internet: URL: http://phenix.int-evry.fr/mpeg/doc_end_user/documents/131_Teleconference/wg11/m54112-JVET-S0126-v2-JVET-S0126-v2.zip JVET-S0126-v2/JVET-S0126rl.docx [retrieved on May 28, 2020].
Bross B., et al., "Versatile Video Coding (Draft 6)", 127th MPEG, Jul. 8, 2019-Jul. 12, 2019, 15th JVET Meeting, Gothenburg, SE, Jul. 3, 2019-Jul. 12, 2019, Joint Video Experts Team (JVET) of ITU-T SG 16 WP 3 and ISO/IEC JTC 1/SC 29/WG 11, 15th Meeting (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages.

* cited by examiner

REFERENCE PICTURE
138

CURRENT PICTURE
136

REFERENCE PICTURE

CURRENT PICTURE

REFERENCE PICTURE
182

CURRENT PICTURE
180

REFERENCE PICTURE
192

CURRENT PICTURE
190

REFERENCE SUBPICTURE SCALING RATIOS FOR SUBPICTURES IN VIDEO CODING

This application claims the benefit of:
U.S. Provisional Patent Application 62/953,015, filed 23 Dec. 2019; and
U.S. Provisional Patent Application 62/954,273, filed 27 Dec. 2019,
the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

To support 360-degree video, the Versatile Video Coding (VVC) standard supports subpictures. This disclosure describes techniques that enable video coders (e.g., video encoders or video decoders) to support reference picture scaling ratios for subpictures. This disclosure also describes techniques to enable video coders to support reference picture resampling and subpictures at the same time.

As explained in greater detail below, subpictures may have different resolutions, e.g., a different number of samples in the subpicture. There currently does not exist a mechanism for a video coder to properly inter predict a current block using a reference block in a subpicture with a different resolution. This disclosure introduces techniques that may enable a video coder to receive scaling parameters for a subpicture of a current picture and scale a prediction block based on the scaling parameters to enable a current block to be inter predicted the current block from a reference subpicture with a different resolution than the first subpicture. The video coder may, for example, determine a scaling ratio based on a ratio of a window of the subpicture of the reference picture and a window of the first subpicture of the current picture. By scaling the prediction block based on the associated scaling parameters for the first subpicture of the current picture, the video coder may advantageously inter predict a current block of one subpicture from a subpicture with a different resolution, which may enable improve overall coding quality. Moreover, by determining a scaling ratio based on scaling windows, rather than the entire subpictures, the techniques of this disclosure may account for changes in perspective (e.g., zooming in or zooming out) that occurred between the current subpicture and the reference picture, which may beneficially further improve overall coding quality by generating more accurate prediction blocks.

According to an example of this disclosure, a method includes determining that a first subpicture of a current picture has associated scaling parameters; in response to determining that the first subpicture of the current picture has the associated scaling parameters, receiving the associated scaling parameters for the first subpicture of the current picture; determining motion information for a block of the first subpicture of the current picture, wherein the motion information identifies a subpicture of a reference picture; locating a prediction block for the block of the first subpicture of the current picture in the subpicture of the reference picture; and scaling the prediction block based on the associated scaling parameters for the first subpicture of the current picture.

According to another example of this disclosure, device for decoding video data includes a memory configured to store video data and one or more processors implemented in circuitry and configured to determine that a first subpicture of a current picture has associated scaling parameters; in response to determining that the first subpicture of the current picture has the associated scaling parameters, receive the associated scaling parameters for the first subpicture of the current picture; determine motion information for a block of the first subpicture of the current picture, wherein the motion information identifies a subpicture of a reference picture; locate a prediction block for the block of the first subpicture of the current picture in the subpicture of the reference picture; and scale the prediction block based on the associated scaling parameters for the first subpicture of the current picture.

According to another example of this disclosure, a computer-readable storage medium stores instructions that when executed by one or more processors cause the one or more processors to determine that a first subpicture of a current picture has associated scaling parameters; in response to determining that the first subpicture of the current picture has the associated scaling parameters, receive the associated scaling parameters for the first subpicture of the current picture; determine motion information for a block of the first subpicture of the current picture, wherein the motion information identifies a subpicture of a reference picture; locate a prediction block for the block of the first subpicture of the current picture in the subpicture of the reference picture; and scale the prediction block based on the associated scaling parameters for the first subpicture of the current picture.

According to another example of this disclosure, an apparatus for coding video data includes means for determining that a first subpicture of a current picture has associated scaling parameters; means for receiving the associated scaling parameters for the first subpicture of the current picture in response to determining that the first subpicture of the current picture has the associated scaling parameters; means for determining motion information for a block of the first subpicture of the current picture, wherein the motion information identifies a subpicture of a reference picture; means for locating a prediction block for the block of the first subpicture of the current picture in the subpicture of the reference picture; and means for scaling the prediction block based on the associated scaling parameters for the first subpicture of the current picture.

The details of one or more examples are set forth in the accompanying drawings and the description below. Other features, objects, and advantages will be apparent from the description, drawings, and claims.

DETAILED DESCRIPTION

Figure 1:
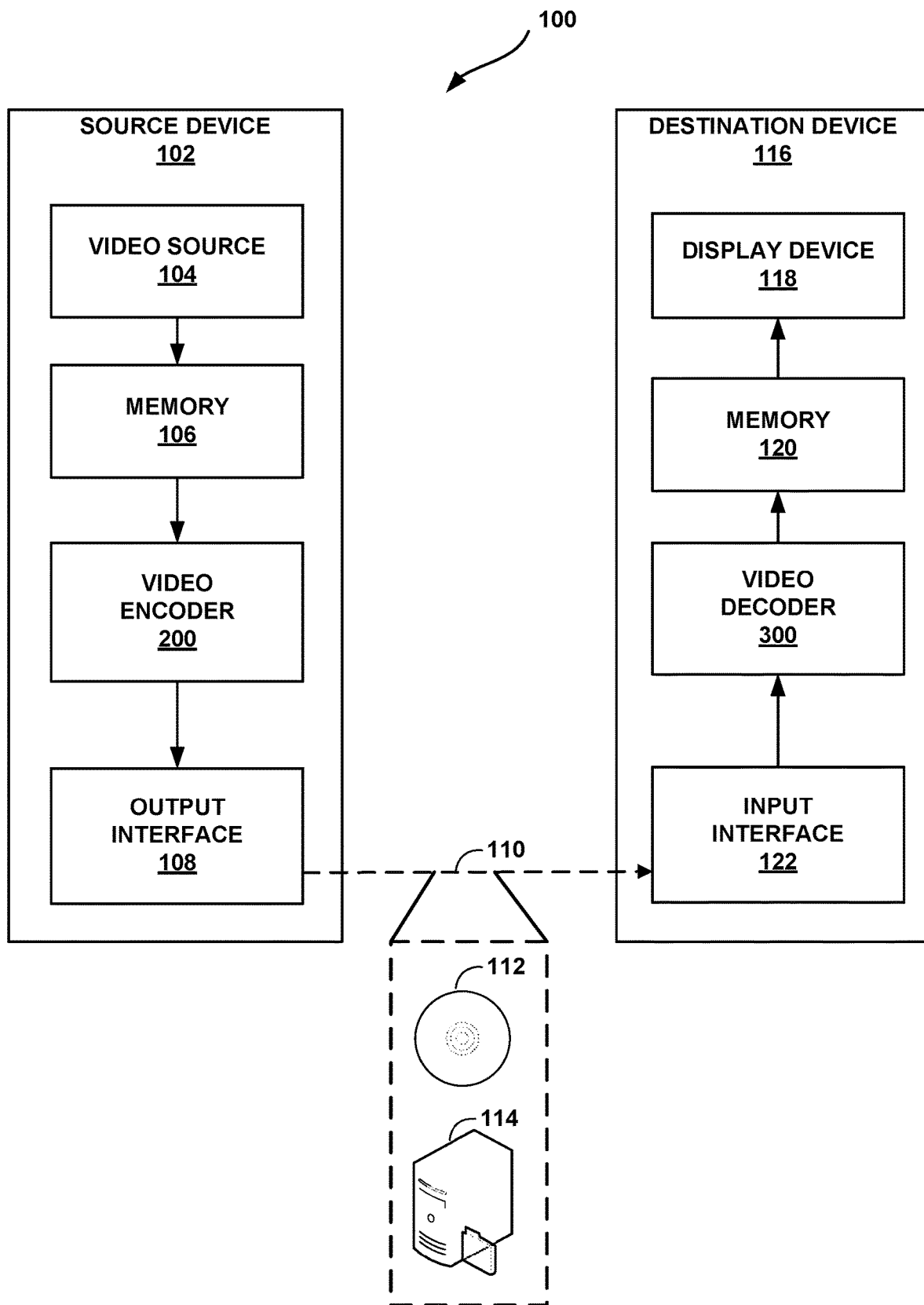
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between samples of the prediction block and samples of the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. To further improve the quality of decoded video, a video decoder can perform one or more filtering operations on the reconstructed video blocks.

Video is encoded as a series of pictures, with each picture being divided into one or more slices. A slice may include an integer number of blocks, e.g., coding tree units (CTUs). In some instances, the blocks within a slice may be grouped into tiles or some other such grouping. For some applications, like two-dimensional movies or television, a picture generally corresponds to a single, continuous scene. For other types of applications, such as 360-degree video, a picture may include multiple subpictures, where the subpictures may each correspond to a single-continuous scene while the picture as a whole does not. A subpicture generally refers to a rectangular region composed of one or more slices within a picture. As one example use case, in some implementations, a 360-degree picture may be patched from 96 different subpictures. The 96 different subpictures may be continuous or discontinuous between boundaries. When streaming a 360-degree video, a user may only receive some of the subpictures.

To support 360-degree video, the Versatile Video Coding (VVC) standard supports subpictures. This disclosure describes techniques that enable video coders (e.g., video encoders or video decoders) to support reference picture scaling ratios for subpictures. This disclosure also describes techniques to enable video coders to support reference picture resampling and subpictures at the same time.

As explained in greater detail below, subpictures may have different resolutions, e.g., a different number of samples in the subpicture. There currently does not exist a mechanism for a video coder to properly inter predict a current block using a reference block in a subpicture with a different resolution. This disclosure introduces techniques that may enable a video coder to receive scaling parameters for a subpicture of a current picture and scale a prediction block based on the scaling parameters to enable a current block to be inter predicted the current block from a reference subpicture with a different resolution than the first subpicture. The video coder may, for example, determine a scaling ratio based on a ratio of a window of the subpicture of the reference picture and a window of the first subpicture of the current picture. By scaling the prediction block based on the associated scaling parameters for the first subpicture of the current picture, the video coder may advantageously inter predict a current block of one subpicture from a subpicture with a different resolution, which may enable improve overall coding quality. Moreover, by determining a scaling ratio based on scaling windows, rather than the entire subpictures, the techniques of this disclosure may account for changes in perspective (e.g., zooming in or zooming out) that occurred between the current subpicture and the reference picture, which may beneficially further improve overall coding quality by generating more accurate prediction blocks.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for reference subpicture scaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for reference subpicture scaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P 2001-v 14 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
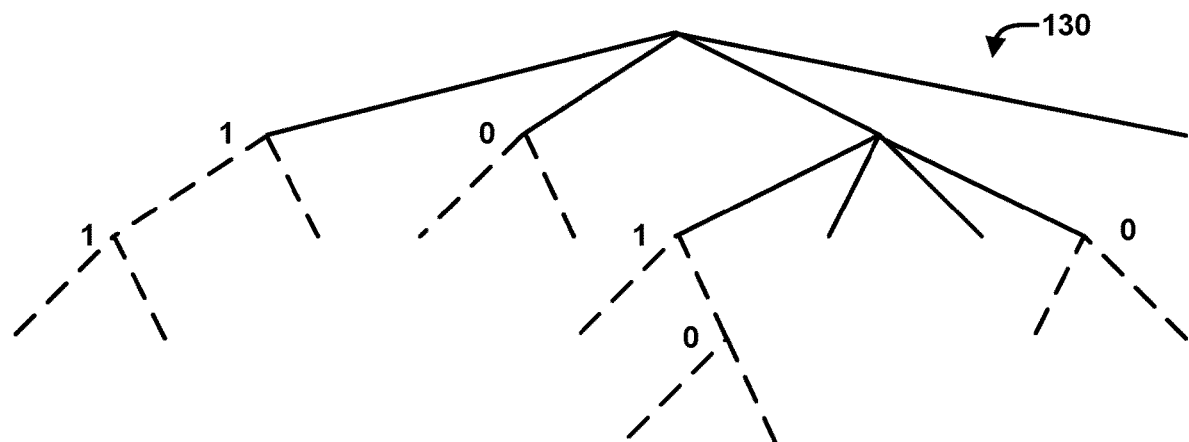
FIGS. 2A and 2B are conceptual diagrams illustrating an example quadtree binary tree (QTBT) structure, and a corresponding coding tree unit (CTU).
Figure 2B:
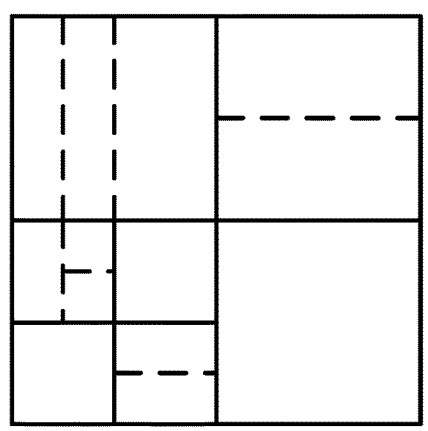

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

This disclosure includes potential improvements to the following portions of VVC Draft 7. Section 7.3.2.3 of VVC Draft 7 is reproduced below.

| | Descriptor |
|---|---|
| seq_parameter_set_rbsp( ) { | |
| ... | |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|   if( subpics_present_flag ) { | |
|     sps_num_subpics_minus1 | u(8) |
|     for( i = 0; i <= sps_num_subpics_minus1; i++ ) | |
|   { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpicsid_presentflag ) { | |
|     sps_subpic_id_signalling_present_flag | u(1) |
|     if( sps_subpic_id_signalling_present_flags ) { | |
|       sps_subpic_id_len_minus1 | ue(v) |
|       for( i =0; i <= sps_num_subpics_minus1; i++ | |
| ) | |
|         sps_subpic_id[ i ] | u(v) |
|     } | |
|   } | |
| ... | |

The syntax elements in the syntax table above have the following definitions from section 7.4.3.3 in VVC Draft 7:

ref_pic_resampling_enabled_flag equal to 1 specifies that reference picture resampling may be applied when decoding coded pictures in the CLVSs referring to the SPS. ref_pic_resampling_enabled_flag equal to 0 specifies that reference picture resampling is not applied when decoding pictures in CLVSs referring to the SPS.

pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY).

pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY).

subpics_present_flag equal to 1 specifies that subpicture parameters are present in in the SPS RBSP syntax. subpics_present_flag equal to 0 specifies that subpicture parameters are not present in the SPS RBSP syntax.

NOTE 2—When a bitstream is the result of a subbitstream extraction process and contains only a subset of the subpictures of the input bitstream to the subbitstream extraction process, it might be required to set the value of subpics_present_flag equal to 1 in the RBSP of the SPSs.

sps_num_subpics_minus1 plus 1 specifies the number of subpictures. sps_num_subpics_minus1 shall be in the range of 0 to 254. When not present, the value of sps_num_subpics_minus1 is inferred to be equal to 0.

subpic_ctu_top_left_x[i] specifies horizontal position of top left CTU of i-th subpicture in unit of CtbSizeY. The length of the syntax element is Ceil(Log 2(pic_width_max_in_luma_samples/CtbSizeY)) bits. When not present, the value of subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log 2(pic_height_max_in_luma_samples/CtbSizeY)) bits. When not present, the value of subpic_ctu_top_left_y[i] is inferred to be equal to 0.

subpic_width_minus1 [i] plus 1 specifies the width of the i-th subpicture in units of CtbSizeY. The length of the syntax element is Ceil(Log 2(pic_width_max_in_luma_samples/CtbSizeY)) bits. When not present, the value of subpic_width_minus1 [i] is inferred to be equal to Ceil (pic_width_max_in_luma_samples/CtbSizeY)−1.

subpic_height_minus1 [i] plus 1 specifies the height of the i-th subpicture in units of CtbSizeY. The length of the syntax element is Ceil(Log 2(pic_height_max_in_luma_samples/CtbSizeY)) bits. When not present, the value of subpic_height_minus1 [i] is inferred to be equal to Ceil (pic_height_max_in_luma_samples/CtbSizeY)−1.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to 0.

sps_subpic_id_present_flag equal to 1 specifies that subpicture ID mapping is present in the SPS. sps_subpic_id_present_flag equal to 0 specifies that subpicture ID mapping is not present in the SPS.

sps_subpic_id_signalling_present_flag equal to 1 specifies that subpicture ID mapping is signalled in the SPS.

sps_subpic_id_signalling_present_flag equal to 0 specifies that subpicture ID mapping is not signalled in the SPS. When not present, the value of sps_subpic_id_signalling_present_flag is inferred to be equal to 0.

sps_subpic_id_len_minus 1 plus 1 specifies the number of bits used to represent the syntax element sps_subpic_id [i]. The value of sps_subpic_id_len_minus 1 shall be in the range of 0 to 15, inclusive.

sps_subpic_id[i] specifies that subpicture ID of the i-th subpicture. The length of the sps_subpic_id[i] syntax element is sps_subpic_id_len_minus 1+1 bits. When not present, and when sps_subpic_id_present_flag equal to 0, the value of sps_subpic_id[i] is inferred to be equal to i, for each i in the range of 0 to sps_num_subpics_minus1, inclusive Section 7.3.2.4 of VVC Draft 7 is reproduced below.

|  | Descriptor |
|---|---|
| pic_parameter_set_rbsp( ) { |  |
| ... |  |
|   pic_width_in_luma_samples | ue(v) |
|   pic_height_in_luma_samples | ue(v) |
| ... |  |
|   scaling_window_flag | u(1) |
|   if( scaling_window_flag ) { |  |
|     scaling_win_left_offset | ue(v) |
|     scaling_win_right_offset | ue(v) |
|     scaling_win_top_offset | ue(v) |
|     scaling_win_bottom_offset | ue(v) |
|   } |  |
| ... |  |
|   pps_subpic_id_signalling_present_flag | u(1) |
|   if( pps_subpics_id_signalling_present_flag ) { |  |
|     pps_num_subpics_minus1 | ue(v) |
|     pps_subpic_id_len_minus1 | ue(v) |
|     for( i = 0; i < = pps_num_subpic_minus1; i++ ) |  |
|       pps_subpic_id[ i ] | u(v) |
|   } |  |
| ... |  |

The syntax elements in the syntax table above have the following definitions from section 7.4.3.4 in VVC Draft 7:

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1 or ref_pic_resampling_enabled_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1 or ref_pic_resampling_enabled_flag equal to 0, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

scaling_window_flag equal to 1 specifies that the scaling window offset parameters are present in the PPS. scaling_window_flag equal to 0 specifies that the scaling window offset parameters are not present in the PPS. When ref_pic_resampling_enabled_flag is equal to 0, the value of scaling_window_flag shall be equal to 0.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidthL=pic_width_in_luma_samples−(scaling_win_right_offset+scaling_win_left_offset) (74)

PicOutputHeightL=pic_height_in_luma_samples−(scaling_win_bottom_offset+scaling_win_top_offset) (75)

pps_subpic_id_signalling_present_flag equal to 1 specifies that subpicture ID mapping is signalled in the PPS. pps_subpic_id_signalling_present_flag equal to 0 specifies that subpicture ID mapping is not signalled in the PPS. When sps_subpic_id_present_flag is 0 or sps_subpic_id_signalling_present_flag is equal to 1, pps_subpic_id_signalling_present_flag shall be equal to 0.

pps_num_subpics_minus 1 plus 1 specifies the number of subpictures in the coded pictures referring to the PPS.

It is a requirement of bitstream conformance that the value of pps_num_subpic_minus 1 shall be equal to sps_num_subpics_minus 1.

pps_subpic_id_len_minus 1 plus 1 specifies the number of bits used to represent the syntax element pps_subpic_id [i]. The value of pps_subpic_id_len_minus 1 shall be in the range of 0 to 15, inclusive.

It is a requirement of bitstream conformance that the value of pps_subpic_id_len_minus 1 shall be the same for all PPSs that are referred to by coded pictures in a CLVS.

pps_subpic_id[i] specifies the subpicture ID of the i-th subpicture. The length of the pps_subpic_id[i] syntax element is pps_subpic_id_len_minus 1+1 bits.

Section 7.3.2.6 of VVC Draft 7 is reproduced below.

| | Descriptor |
|---|---|
| picture_header_rbsp( ) { | |
| ... | |
|   if( sps_subpic_id_present_flag && !sps_subpic_id_signalling_flag ) | |
|   { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[ i ] | u(v) |
|     } | |
|   } | |
| ... | |

The syntax elements in the syntax table above have the following definitions from section 7.4.3.6 in VVC Draft 7:

ph_subpic_id_signalling_present_flag equal to 1 specifies that subpicture ID mapping is signalled in the PH. ph_ubpic_id_signalling_present_flag equal to 0 specifies that subpicture ID mapping is not signalled in the PH.

ph_subpic_id_len_minus 1 plus 1 specifies the number of bits used to represent the syntax element ph_subpic_id[i]. The value of pic_subpic_id_len_minus 1 shall be in the range of 0 to 15, inclusive.

It is a requirement of bitstream conformance that the value of ph_subpic_id_len_minus 1 shall be the same for all PHs that are referred to by coded pictures in a CLVS.

ph_subpic_id[i] specifies that subpicture ID of the i-th subpicture. The length of the ph_subpic_id[i] syntax element is ph subpic_id_len_minus 1+1 bits.

The list SubpicIdList[i] is derived as follows:

```
for(i = 0; i <= sps_num_subpics_minus1; i++ )
    SubpicIdList[ i ] = sps_subpic_id_present_flag ?
        (76)
        ( sps_subpic_id_signalling_flag ? sps_subpic_id[ i ] :
        (ph_subpic_id_signalling_present_flag ? ph_subpic_id[ i ] : pps_subpic_id[ i ]))
    ) : i
```

Section 7.3.7.1 of VVC Draft 7 is reproduced below.

| | Descriptor |
|---|---|
| slice_header( ) { | |
| ... | |
|   if( subpics_present_flag ) | |
|     slice_subpic_id | |
| ... | |

The syntax elements in the syntax table above have the following definitions from section 7.4.8.1 in VVC Draft 7:
slice_subpic_id specifies the subpicture identifier of the subpicture that contains the slice. If slice_subpic_id is present, the value of the variable SubPicIdx is derived to be such that SubpicIdList[SubPicIdx] is equal to slice_subpic_id. Otherwise (slice_subpic_id is not present), the variable SubPicIdx is derived to be equal to 0. The length of slice_subpic_id, in bits, is derived as follows:

If sps_subpic_id_signalling_present_flag is equal to 1, the length of slice_subpic_id is equal to sps_subpic_id_len_minus 1+1.

Otherwise, if ph_subpic_id_signalling_present_flag is equal to 1, the length of slice_subpic_id is equal to ph_subpic_id_len_minus 1+1.

Otherwise, if pps_subpic_id_signalling_present_flag is equal to 1, the length of slice_subpic_id is equal to pps_subpic_id_len_minus 1+1.

Otherwise, the length of slice_subpic_id is equal to Ceil (Log 2 (sps_num_subpics_minus 1+1)).

The variables SubPicLeftBoundaryPos, SubPicTopBoundaryPos, SubPicRightBoundaryPos, and SubPicBotBoundaryPos are derived as follows:

```
if( subpic_treated_as_pic_flag[ SubPicIdx ]) {
    SubPicLeftBoundaryPos = subpic_ctu_top_left_x[ SubPicIdx ] * CtbSizeY
    SubPicRightBoundaryPos = Min( pic_width_max_in_luma_samples − 1,
    ( subpic_ctu_top_left_x[ SubPicIdx ] + subpic_width_minus1[ SubPicIdx ] +
1) * CtbSizeY − 1)
    SubPicTopBoundaryPos = subpic_ctu_top_left_y[ SubPicIdx ] *CtbSizeY
    (116)
    SubPicBotBoundaryPos = Min( pic_height_max_in_luma_samples − 1,
    ( subpic_ctu_top_left_y[ SubPicIdx ] + subpic_height_minus1[ SubPicIdx ]
+ 1 ) * CtbSizeY − 1)
}
```

Section 8.3.2 of VVC Draft 7 is reproduced below.
The reference picture lists RefPicList[0] and RefPicList[1], the reference picture scaling ratios RefPicScale[i][j][0] and RefPicScale[i][j][1,] and the reference picture scaled flags RefPicIsScaled[0] and RefPicIsScaled[1] are constructed as follows:

```
for( i = 0; i < 2; i++ ) {
    for( j = 0, k = 0, pocBase = PicOrderCntVal; j <
num_ref_entries[ i ][ RplsIdx[ i ] ]; j++) {
        if( !inter_layer_ref_pic_flag[ i ][ RplsIdx[ i ] ][ j ] ) {
            if( st_ref_pic_flag[ i ][ RplsIdx[ i ] ][ j ] ) {
                RefPicPocList[ i ][ j ] =
pocBase − DeltaPocValSt[ i ][ RplsIdx[ i ] ][ j ]
                if( there is a reference picture picA in the DPB with the same
nuh_layer_id as the current picture
                        and PicOrderCntVal equal to RefPicPocList[ i ][ j ] )
                    RefPicList[ i ][ j ] = picA
                else
                    RefPicList[ i ][ j ] = "no reference picture"         (200)
                pocBase = RefPicPocList[ i ][ j ]
            } else {
                if(! delta_poc_msb_cycle_lt[ i ][ k ] ) {
                    if( there is a reference picA in the DPB with the same nuh_layer_id
as the current picture and
                            PicOrderCntVal & ( MaxPicOrderCntLsb − 1 ) equal to
PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id
as the current picture and
                            PicOrderCntVal equal to        FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else {
            layerIdx =
DirectDependentLayerIdx[ GeneralLayerIdx[ nuh_layer_id ] ][ ilrp_idx[ i ][ RplsI
dx ][ j ] ]
            refPicLayerId = vps_layer_id[ layerIdx ]
            if( there is a reference picture picA in the DPB with nuh_layer_id equal
to refPicLayerId and
``` the same PicOrderCntVal as the current picture )
            RefPicList[ i ][ j ] = picA
        else
            RefPicList[ i ][ j ] = "no reference picture"
    }
    fRefWidth is set equal to PicOutputWidthL of the reference picture
RefPicList[ i ][ j ] in luma samples
        fRefHeight is set equal to PicOutputHeightL of the reference picture
RefPicList[ i ][ j ] in luma samples
        RefPicScale[ i ][ j ][ 0 ] =
( ( fRefWidth << 14 ) + (PicOutputWidthL >> 1 ) ) / PicOutputWidthL
        RefPicScale[ i ][ j ][ 1 ] =
( ( fRefHeight << 14 ) + ( PicOutputHeightL >> 1 ) ) / PicOutputHeightL
        RefPicIsScaled[ i ][ j ] = ( RefPicScale[ i ][ j ][ 0 ] != (1 << 14 ) ) | |
                                        ( RefPicScale[ i ][ j ][ 1 ] != ( 1 << 14 ) )
    }
}

This disclosure also describes potential improvements for the decoder side motion vector refinement described in section 8.5.3 of VVC Draft 7 and for the decoder process for inter blocks in section 8.5.6 of VVC Draft 7.

The sections of VVC Draft 7 introduced above may have several problems that can be addressed by the techniques of this disclosure. This disclosure describes several changes to VVC Draft 7. The techniques of this disclosure may be used individually or in various combinations.

Figure 3:
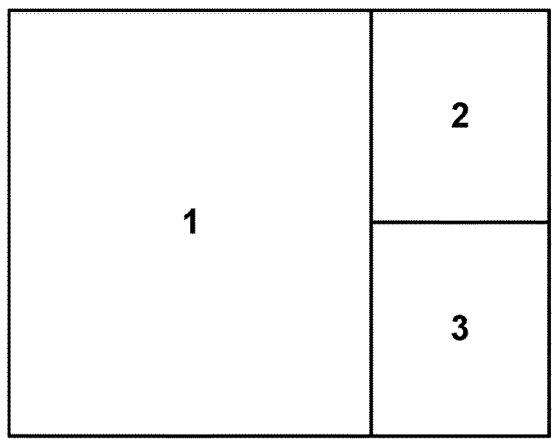
FIG. 3 shows examples of subpicture sizes with the same corresponding subpicture IDs in a reference picture and a current picture.
Figure 3:
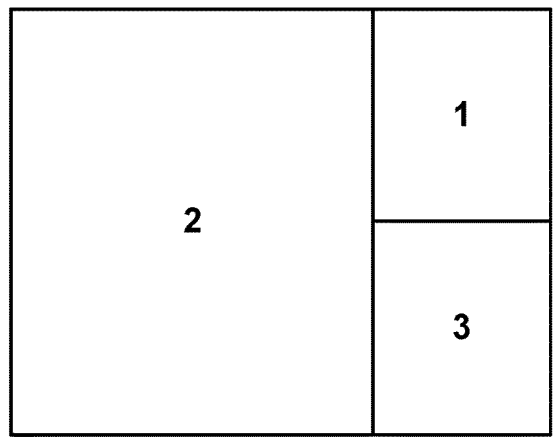
Figure 5:
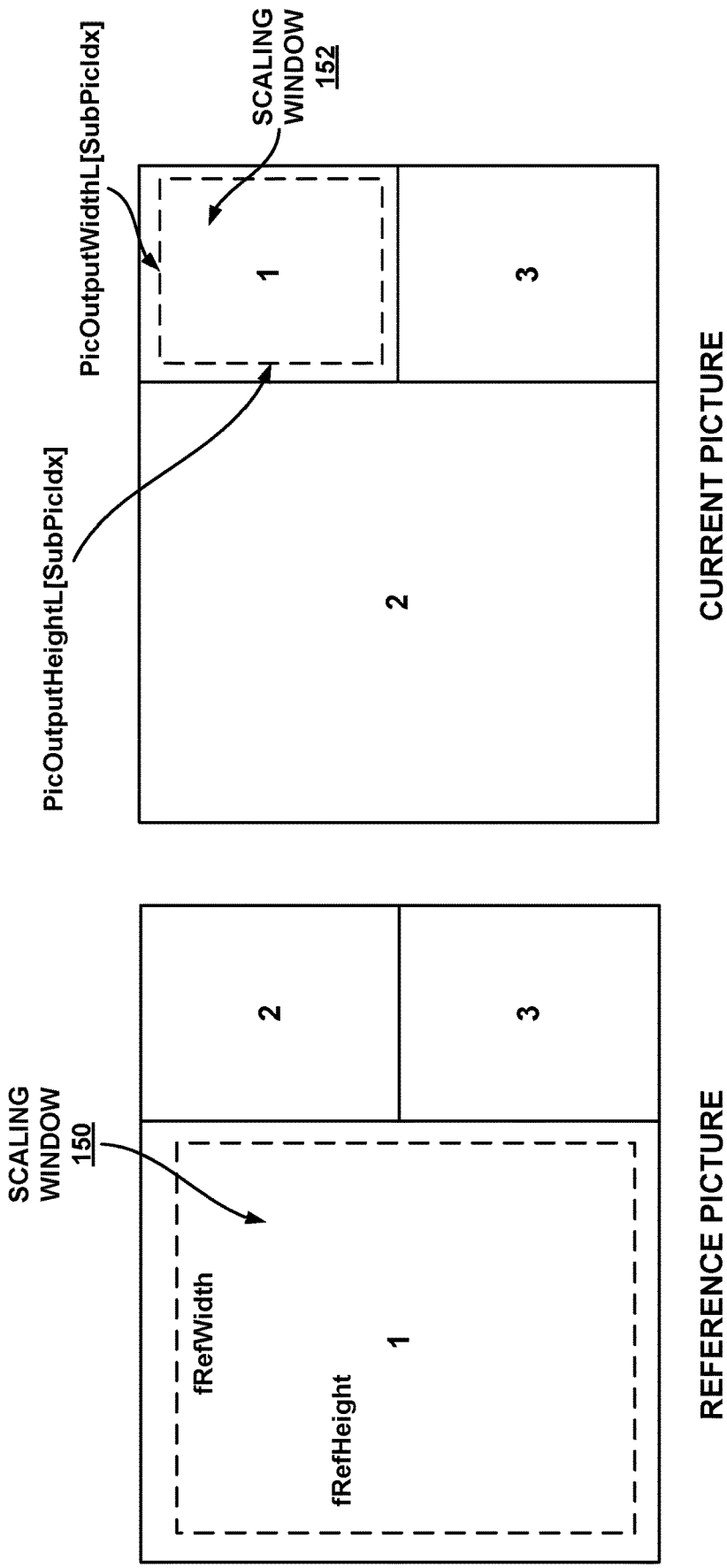
FIG. 5 shows an example of a scaling window.

In an example from VVC Draft 7, the subpicture ID may change within a coded layer video sequence (CLVS). A video source may stream in a specific subpicture using the same subpicture ID, such that, for example, only one subpicture of a picture is being rendered or displayed at any given time. As shown in FIGS. 3 and 5, separate source contents may stream in three respective subpictures. If a current subpicture is treated as a picture, then video decoder 300 may, for example, treat the other subpictures as not existing. In such a case, the current subpicture should refer to the reference subpicture with the same subpicture ID. However, this may lead to different resolutions between the reference subpicture and the current subpicture, as shown in FIG. 3. There is no reference subpicture scaling process in VVC Draft 7 to scale a reference subpicture to a current subpicture. According to techniques of this disclosure, video encoder 200 and video decoder 300 may be configured to use techniques such as scaling windows, derived scaling ratios, ranges of the scaling ratios, and integer positions for interpolation filtering to handle the subpicture scaling ratios process when the subpicture ID may change within a CLVS and the reference picture resampling (RPR) is disabled, i.e., ref_pic_resampling_enabled_flag is set equal to 0.

FIG. 3 shows examples of subpicture sizes with the same corresponding subpicture IDs, between a reference picture and a current picture, that have identical sizes and that have different sizes. In FIG. 3, current picture 136 includes subpictures with IDs 1, 2, and 3, and reference picture 138 also includes subpictures with IDs 1, 2, and 3. In the example of FIG. 3, the subpictures with IDs 1 and 2 in current picture 136 have different sizes than the subpicture with IDs 1 and 2 in reference picture 138, but the subpictures with ID 3 in current picture 136 has the same size as the subpicture with ID 3 in reference picture 138.

According to the technqiues of this disclosure, video encoder 200 and video decoder 300 may be configured to utilize subpicture-based scaling windows. In VVC Draft 7, a reference picture scaling process is used when the reference picture size and the current picture size are different. This process is described by VVC Draft 7 section 8.3.2, as follows:

RefPicScale[ i ][ j ][ 0 ] =
( ( fRefWidth << 14 ) + ( PicOutputWidthL >> 1 ) ) / PicOutputWidthL
RefPicScale[ i ][ j ][ 1 ] =
( ( fRefHeight << 14 ) + ( PicOutputHeightL >> 1 ) ) / PicOutputHeightL where fRefWidth and fRefHeight are set equal to PicOutputWidthL and PicOutputHeightL of the reference picture RefPicList[i][j] in luma samples, respectively. PicOutputWidthL and PicOutputHeightL are the scaling window width and height, as shown in FIG. 4, and are cropped from the picture width and height as shown below:

PicOutputWidthL = pic_width_in_luma_samples − ( scaling_win_right_offset
+ scaling_win_left_offset)
        PicOutputHeightL = pic_height_in_luma_samples − (
scaling_win_bottom_offset + scaling_win_top_offset )

Figure 4:
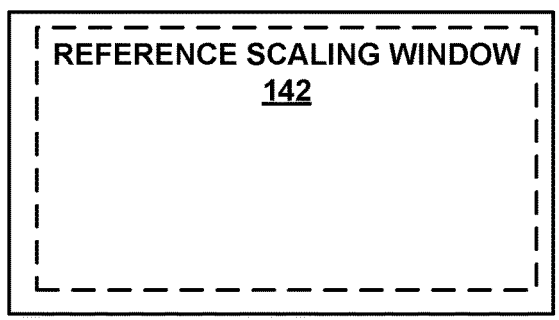
FIG. 4 shows an example of scaling windows inside a reference picture and a current picture.
Figure 4:
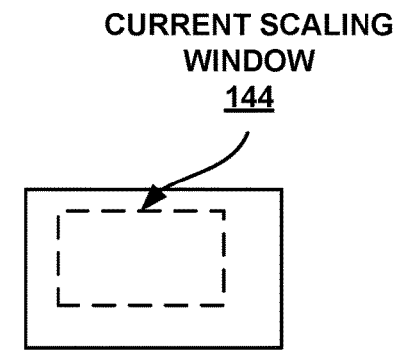

FIG. 4 shows an example of scaling windows inside a reference picture and a current picture. Rather than determining a scaling factor based on the sizes of the reference picture and the current picture, video encoder 200 and video decoder 300 may determine a scaling ratio based on reference scaling window 142 and current scaling window 144. The scaling window may be used to avoid the location misalignment in the reference picture scaling process caused by zooming or shifting between the time instances of the reference picture and the current picture.

Video encoder 200 and video decoder 300 may be configure to apply the same reference picture scaling process of FIG. 4 to subpictures that have the same ID but different sizes. Video encoder 200 and video decoder 300 may apply a scaling window a current subpicture in scenarios where the subpicture is being treated as a picture, for instance when only one subpicture of a picture is being decoded or displayed. According to techniques of this disclosure, video encoder 200 and video decoder 300 may be configured to perform the following techniques, which will be described as modifications relative to VVC Draft 7:

For each subpicture, video encoder 200 and video decoder 300 may code a scaling window flag, e.g. pps_scaling_window_flag[i]. If the i-th flag pps_scaling_window_flag[i] is equal to 1, the scaling window offsets, pps_scaling_win_left_offset[i], pps_scaling_win_right_offset[i], pps_scaling_win_top_offset[i], and pps_scaling_win_bottom_offset[i] are signaled for the i-th subpicture.

Video encoder 200 and video decoder 300 may be configured to signal the number of subpictures in the CLVS in a PPS before a group of the scaling window parameters is signaled.

Video encoder 200 and video decoder 300 may be configured to infer that the value of pps_scaling_window_flag[i] is 0 to avoid unexpected activation of the reference picture scaling process if at least one of the following conditions is true:

ref_pic_resampling_enabled_flag is equal to 0 and subpics_present_flag is equal to 0 (e.g., RPR functionality and subpicture functionality are both disabled);

ref_pic_resampling_enabled_flag is equal to 0 and sps_subpic_id_present_flag is equal to 0 (e.g., RPR functionality is disabled, and a subpicture ID list is not reordered in the CLVS);

ref_pic_resampling_enabled_flag is equal to 0 and sps_subpic_id_signalling_present_flag is equal to 1 (e.g., RPR functionality is disabled, and a subpicture ID list is not reordered in the CLVS);

subpics_present_flag is equal to 1 and subpic_treated_as_pic_flag[i] is equal to 0 (e.g., subpicture functionality is enabled and the i-th subpicture is not treated as a picture); or ref_pic_resampling_enabled_flag is equal to 1 and subpics_present_flag is equal to 1 (e.g., RPR functionality and subpicture functionality cannot be enabled at the same time).

pps_scaling_win_left_offset[i]+pps_scaling_win_right_offset[i]<=subpic_width_in_luma_samples[i], where subpic_width_in_luma_samples[i] is the width for the i-th subpicture.

pps_scaling_win_top_offset[i]+pps_scaling_win_bottom_offset[i]<=subpic_height_in_luma_samples[i], where subpic_height_in_luma_samples[i] is the height for the i-th subpicture.

Subpicture-based scaling window parameters are signaled in both PPS, e.g. pps_scaling_win_left_offset[i], pps_scaling_win_right_offset[i], pps_scaling_win_top_offset[i], and pps_scaling_win_bottom_offset[i], and PH, e.g. ph_scaling_win_left_offset[i], ph_scaling_win_right_offset[i], ph_scaling_win_top_offset[i], and ph_scaling_win_bottom_offset[i]. Based on the scaling window flag in PH, i.e., phscaling window flag[i], the parameters in PH can override the parameter in PPS, e.g. scaling_win_bottom_offset[i]=(ph_scaling_window_flag[i])? ph_scaling_win_left_offset[i]: pps_scaling_win_left_offset[i].

In some examples, the subpicture-based scaling window parameters may only be signaled in the PPS.

In some examples, the subpicture-based scaling window parameters may only be signaled in the PH.

Video encoder 200 and video decoder 300 may be configured to derive a scaling window width and height for the i-th subpicture by cropping the i-th subpicture with the i-th scaling window offsets as follows:

PicOutputWidthL[ i ] = subpic_width_in_luma_samples[ i ] − ( scaling_win_right_offset[ i ] + scaling_win_left_offset[ i ] )
PicOutputHeightL[ i ] = subpic_height_in_luma_samples[ i ] − ( scaling_win_bottom_offset[ i ] + scaling_win_top_offset[ i ] )

Modifications to section 7.3.2.4 in VVC Draft 7 described in this disclosure are shown below. The syntax changes to VVC Draft 7 are shown in the following table. The tag "<ADD>" shows the beginning of additions, and the tag "</ADD>" shows the end of those additions. The tag "<DEL>" shows the beginning of deletions (i.e., text removal), and the tag "</DEL>" shows the end of those deletions.

| | Descriptor |
|---|---|
| pic_parameter_set_rbsp( ) { | |
| ... | |
|   pic_width_in_luma_samples | ue(v) |
|   pic_height_in_luma_samples | ue(v) |
| ... | |
|   <DEL>scaling_window_flag | u(1) |
|   if(scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | </DEL> |
|   <ADD>pps_num_subpics_minus1 | ue(v) |
|   for( i = 0; i <= pps_num_subpics_minusl; i++ ) { | |
|     pps_scaling_window_flag[ i ] | u(1) |
|     if( pps_scaling_window_flag[ i ] ) { | |
|       pps_scaling_win_left_offset[ i ] | ue(v) |
|       pps_scaling_win_right_offset[ i ] | ue(v) |
|       pps_scaling_win_top_offset[ i ] | ue(v) |
|       pps_scaling_win_bottom_offset[ i ] | ue(v) |
|     } | |
|   } | </ADD> |
| ... | |
|   pps_subpic_id_signalling_present_flag | u(1) |
|   if( pps_subpics_id_signalling_present_flag ) { | |
|     <DEL> pps_num_subpics_minus1 </DEL> | <DEL>ue(v)</DEL> |
|     pps_subpic_id_len_minus1 | ue(v) |
|     for( i = 0; i <= pps_num_subpic_minus1; i++ ) | |
|       pps_subpic_id[ i ] | u(v) |
|   } | |
| ... | |

Modifications to section 7.4.3.4 in VVC Draft 7 are shown below.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1 or ref_pic_resampling_enabled_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1 or ref_pic_resampling_enabled_flag equal to 0, the value of pic_height_in_luma_samples shall be equal to pic_height_max_in_luma_samples.

<DEL>
scaling_window_flag equal to 1 specifies that the scaling window offset parameters are present in the PPS. scaling_window_flag equal to 0 specifies that the scaling window offset parameters are not present in the PPS. When ref_pic_resampling_enabled_flag is equal to 0, the value of scaling_window_flag shall be equal to 0.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.
</DEL>

<ADD>
pps_num_subpics_minus1 plus 1 specifies the number of subpictures in the coded pictures referring to the PPS.

It is a requirement of bitstream conformance that the value of pps_num_subpic_minus1 shall be equal to sps_num_subpics_minus1.

pps_scaling_window_flag[i] equal to 1 specifies that the scaling window offset parameters for the i-th subpicture are present in the PPS. pps_scaling_window_flag[i] equal to 0 specifies that the scaling window offset parameters are not present for the i-th subpicture in the PPS.

The value of pps_scaling_window_flag[i] shall be inferred to be 0 if one of the following conditions is true:
  ref_pic_resampling_enabled_flag is equal to 0 and subpics_present_flag is equal to 0
  ref_pic_resampling_enabled_flag is equal to 0 and sps_subpic_id_present_flag is equal to 0
  ref_pic_resampling_enabled_flag is equal to 0 and sps_subpic_id_signalling_present_flag is equal to 1
  subpics_present_flag is equal to 1 and subpic_treated_as_pic_flag[i] is equal to 0
  ref_pic_resampling_enabled_flag is equal to 1 and subpics_present_flag is equal to 1 pps_scaling_win_left_offset[i], pps_scaling_win_right_offset[i], pps_scaling_win_top_offset[i], and pps_scaling_win_bottom_offset[i] specify the offsets, in units of luma samples, that are applied to the picture size for scaling ratio calculation of the i-th subpicture. When pps_scaling_window_flag[i] is equal to 0, the values of pps_scaling_win_left_offset[i], pps_scaling_win_right_offset[i], pps_scaling_win_top_offset[i], and pps_scaling_win_bottom_offset[i] are inferred to be equal to 0.

The width and height of the i-th subpicture is derived as follows:

```
subpic_width_in_luma_samples[ i ] = Min( pic_width_in_luma_samples,
( subpic_ctu_top_left_x[ i ] + subpic_width_minus1[ i ] + 1 ) * CtbSizeY ) −
subpic_ctu_top_left_x[ i ] * CtbSizeY
    subpic_height_in_luma_samples[ i ] = Min(
pic_height_in_luma_samples, ( subpic_ctu_top_left_y[ i ] +
subpic_height_minus_1[ i ] + 1 ) * CtbSizeY ) − subpic_ctu_top_left_y[ i ] *
CtbSizeY
```

The value of pps_scaling_win_left_offset[i]+pps_scaling_win_right_offset[i] shall be less than subpic_width_in_luma_samples[i], and the value of pps_scaling_win_top_offset[i]+pps_scaling_win_bottom_offset[i] shall be less than subpic_height_in_luma_samples[i].
</ADD>

Modifications to section 7.3.2.6 in VVC Draft 7 are shown below.

| | Descriptor |
|---|---|
| Picture_header_rbsp( ) { | |
| ... | |
| <ADD>If( (!ref_pic_resampling_enabled_flag && pps_subpic_id_signalling_present_flag && | |
|     subpic_treated_as_pic_flag[ i ] ) \|\| | |
|   (ref_pic_resampling_enabled_flag && !subpics_present_flag) ) | |
| { | |
|   for( i = 0; i <= sps_num_subpics_minus1; i++ ) { | |
|     ph_scaling_window_flag[ i ] | u(1) |
|     if( ph_scaling_window_flag[ i ] ) { | |
|       ph_scaling_win_left_offset[ i ] | ue(v) |
|       ph_scaling_win_right_offset[ i ] | ue(v) |
|       ph_scaling_win_top_offset[ i ] | ue(v) |
|       ph_scaling_win_bottom_offset[ i ] | ue(v) |
|     } | |
|   } | |
| } | </ADD> |
| ... | |

Modifications to section 7.4.3.6 in VVC Draft 7 are shown below.

<ADD>ph_scaling_window_flag[i] equal to 1 specifies that the scaling window offset parameters for the i-th subpicture are present in the PH. ph_scaling_window_flag[i] equal to 0 specifies that the scaling window offset parameters for the i-th subpicture are not present in the PH. If not present, the value of ph_scaling_window_flag[i] shall be inferred to be 0.

ph_scaling_win_left_offset[i], ph_scaling_win_right_offset[i], ph_scaling_win_top_offset[i], and ph_scaling_win_bottom_offset[i] specify the offsets, in units of luma samples, that are applied to the picture size of the i-th subpicture for scaling ratio calculation. When ph_scaling_window_flag[i] is equal to 0, the values of ph_scaling_win_left_offset[i], ph_scaling_win_right_offset[i], ph_scaling_win_top_offset[i], and ph_scaling_win_bottom_offset[i] are inferred to be equal to 0.

The value of ph_scaling_win_left_offset[i]+ph_scaling_win_right_offset[i] shall be less than subpic_width_in_luma_samples[i], and the value of ph_scaling_win_top_offset[i]+ph_scaling_win_bottom_offset[i] shall be less than subpic_height_in_luma_samples[i].

The variables scaling_win_left_offset[i], scaling_win_right_offset[i], scaling_win_top_offset[i], and scaling_win_bottom_offset[i] are derived as follows:

```
scaling_win_left_offset[ i ] = ph_scaling_window_flag[ i ] ?
ph_scaling_win_left_offset[ i ] : pps_scaling_win_left_offset[ i ]
    scaling_win_right_offset[ i ] = ph_scaling_window_flag[ i ] ?
ph_scaling_win_right_offset[ i ] : pps_scaling_win_ right_offset[ i ]
    scaling_win_top_offset[ i ] = ph_scaling_window_flag[ i ] ?
ph_scaling_win_ top_offset[ i ] : pps_scaling_win_ top_offset[ i ]
    scaling_win_bottom_offset[ i ] = ph_scaling_window_flag[ i ] ?
ph_scaling_win_bottom_offset[ i ] : pps_scaling_win_ bottom_offset[ i ]
```

The variables PicOutputWidthL[i] and PicOutputHeightL[i] are derived as follows:

```
PicOutputWidthL[ i ] = subpic_weight_in_luma_samples[ i ] –
    (scaling_win_right_offset[ i ] + scaling_win_left_offset[ i ] )
PicOutputHeightL[ i ] = subpic_height_in_luma_samples[ i ] –
    (scaling_win_bottom_offset[ i ] + scaling_win_top_offset[ i ] )
```
</ADD>

Video decoder 300 may be configured to infer that the value of pps_scaling_window_flag[i] is to be zero based on the following example process, which may include only one condition, or at least two conditions, as shown below:

ref_pic_resampling_enabled_flag is equal to 0 and subpics_present_flag is equal to 0 (RPR functionality and subpicture functionality are both disabled)

ref_pic_resampling_enabled_flag is equal to 0 and sps_subpic_id_present_flag is equal to 0 (RPR functionality is disabled, and a subpicture ID list is not reordered in the CLVS)

ref_pic_resampling_enabled_flag is equal to 0 and sps_subpic_id_signalling_present_flag is equal to 1 (RPR functionality is disabled, and a subpicture ID list is not reordered in the CLVS)

subpics_present_flag is equal to 1 and subpic_treated_as_pic_flag[i] is equal to 0 (subpicture functionality is enabled and the i-th subpicture is not treated as a picture)

ref_pic_resampling_enabled_flag is equal to 1 and subpics_present_flag is equal to 1 (RPR functionality and subpicture functionality cannot be enabled at the same time)

ref_pic_resampling_enabled_flag is equal to 1, sps_subpic_id_present_flag is equal to 1, and sps_subpic_id_signalling_present_flag is equal to 0 (RPR functionality and subpicture ID reordering functionality cannot be enabled at the same time)

In some examples of this disclosure, video decoder 300 may use only the following four conditions to infer the value of pps_scaling_window_flag[i] to be zero:

The value of pps_scaling_window_flag[i] shall be inferred to be 0 to avoid unexpected activation of the reference picture scaling process if at least one of the following conditions is true ref_pic_resampling_enabled_flag is equal to 0 and subpics_present_flag is equal to 0 (RPR functionality and subpicture functionality are both disabled)

ref_pic_resampling_enabled_flag is equal to 0 and sps_subpic_id_present_flag is equal to 0 (RPR functionality is disabled, and subpicture ID list is not reordered in the CLVS)

ref_pic_resampling_enabled_flag is equal to 0 and sps_subpic_id_signalling_present_flag is equal to 1 (RPR functionality is disabled, and subpicture ID list is not reordered in the CLVS)

subpics_pesent-flag is equal to 1 and subpic_treated_as_pic_flag[i] is equal to 0 (subpicture functionality is enabled and the i-th subpicture is not treated as a picture)

Note that this example may also be applied to the case where the subpicture ID may change within a CLVS and the reference picture resampling (RPR) is enabled, i.e., ref_pic_resampling_enabled_flag is set equal to 1.

In some examples, only the following five conditions may be used to infer the value of pps_scaling_window_flag[i] to be zero:

The value of pps_scaling_window_flag[i] shall be inferred to be 0 to avoid unexpected activation of the reference picture scaling process if at least one of the following conditions is true ref_pic_resampling_enabled_flag is equal to 0 and subpics_present_flag is equal to 0 (RPR functionality and subpicture functionality are both disabled)

ref_pic_resampling_enabled_flag is equal to 0 and sps_subpic_id_present_flag is equal to 0 (RPR functionality is disabled, and subpicture ID list is not reordered in the CLVS)

ref_pic_resampling_enabled_flag is equal to 0 and sps_subpic_id_signalling_present_flag is equal to 1 (RPR functionality is disabled, and subpicture ID list is not reordered in the CLVS)

subpics_present_flag is equal to 1 and subpic_treated_as_pic_flag[i] is equal to 0 (subpicture functionality is enabled and the i-th subpicture is not treated as a picture)

ref_pic_resampling_enabled_flag is equal to 1, sps_subpic_id_present_flag is equal to 1, and sps_subpic_id_signalling_present_flag is equal to 0 (RPR functionality and subpicture ID reordering functionality cannot be enabled at the same time)

Note that this example may also be applied to cases where the subpicture ID may not change within a CLVS and the reference picture resampling (RPR) is enabled, i.e., ref_pic_resampling_enabled_flag is set equal to 1.

In some examples video encoder 200 may signal the original picture scaling window parameters, scaling_win_left_offset[i], scaling_win_right_offset[i], scaling_win_top_offset[i], and scaling_win_bottom_offset [i], in a PPS, and the subpicture-based scaling window parameters, pps_scaling_win_left_offset[i], pps_scaling_win_right_offset[i], pps_scaling_win_top_offset[i], pps_scaling_win_bottom_offset[i], ph_scaling_win_left_offset[i], ph_scaling_win_right_offset[i], ph_scaling_win_top_offset[i], and ph_scaling_win_bottom_offset[i], in the manner described above. The original picture scaling window parameters may be used for the scaling process between the reference picture and the current picture, and the subpicture-based scaling window is for the scaling process for the reference subpicture and the current subpicture. This design can be applied when the subpicture ID may change within a CLVS and the reference picture resampling (RPR) is enabled, i.e., ref_pic_resampling_enabled_flag is set equal to 1. The syntax may be as follows:

|  | Descriptor |
| --- | --- |
| pic_parameter_set_rbsp( ) { | |
| ... | |
| scaling_window_flag | u(1) |
| if( scaling_window_flag ) { | |
| scaling_win_left_offset | ue(v) |
| scaling_win_right_offset | ue(v) |
| scaling_win_top_offset | ue(v) |

-continued

|  | Descriptor |
| --- | --- |
| scaling_win_bottom_offset | ue(v) |
| } | |
| pps_num_subpics_minus1 | ue(v) |
| for( i = 0; i <= pps_num_subpics_minus1; i++ ) { | |
| pps_scaling_window_flag[ i ] | u(1) |
| if( pps_scaling_window_flag[ i ] ) { | |
| pps_scaling_win_left_offset[ i ] | ue(v) |
| pps_scaling_win_right_offset[ i ] | ue(v) |
| pps_scaling_win_top_offset[ i ] | ue(v) |
| pps_scaling_win_bottom_offset[ i ] | ue(v) |
| } | |
| } | |

Video encoder 200 and video decoder 300 may be configured to perform derivation of the reference subpicture scaling ratio. As shown in FIG. 5, the same derivation of the scaling ratios for the reference picture may be applied to the subpicture design described herein by adding a subpicture index to the design of VVC Draft 7:

fRefWidth and fRefHeight are defined as PicOutputWidthL[RefSubPicIdx] and PicOutputHeightL[RefSubPicIdx] of the reference picture RefPicList[i][j] in luma samples, respectively, where RefSubPicIdx is derived to be such that SubpicIdList[RefSubPicIdx] of the reference picture RefPicList[i][j] is equal to slice_subpic_id of the current slice. Then the scaling ratios are derived as follows:

RefPicScale[ i ][ j ][ 0 ] = ( ( fRefWidth << 14 ) + ( PicOutputWidthL[ SubPicIdx ] >> 1 ) ) / PicOutputWidthL[ SubPicIdx ]
RefPicScale[ i ][ j ][ 1 ] = ( ( fRefHeight << 14 ) + ( PicOutputHeightL[ SubPicIdx ] >> 1 ) ) / PicOutputHeightL[ SubPicIdx ]
    where SubPicIdx is derived to be such that SubpicIdList[ SubPicIdx ] of the current picture is equal to slice_subpic_id of the current slice FIG. 5 shows a scaling window 150 with fRefWidth and fRefHeight for the reference subpicture 1, and the scaling window 152 with PicOutputWidthL[1] and PicOutputHeightL[1] for the current subpicture. RefSubPicIdx and SubPicIdx are subpicture layout indexes and are respectively equal to 0 and 1 for a subpicture using ID=1

Video decoder 300 may be configured to infer the value of the scaling ratios RefPicScale[i][j][0] and RefPicScale[i][j][1] to be equal to 1<<14 to avoid unexpected activation of the reference picture scaling process if at least one of the following conditions is true ref_pic_resampling_enabled_flag is equal to 0 and subpics_present_flag is equal to 0 (RPR functionality and subpicture functionality are both disabled)

ref_pic_resampling_enabled_flag is equal to 0 and sps_subpic_id_present_flag is equal to 0 (RPR functionality is disabled, and subpicture ID list is not reordered in the CLVS)

ref_pic_resampling_enabled_flag is equal to 0 and sps_subpic_id_signalling_present_flag is equal to 1 (RPR functionality is disabled, and subpicture ID list is not reordered in the CLVS)

subpics_present_flag is equal to 1 and subpic_treated_as_pic_flag[i] is equal to 0 (subpicture functionality is enabled and the i-th subpicture is not treated as a picture)

ref_pic_resampling_enabled_flag is equal to 1 and subpics_present_flag is equal to 1 (RPR functionality and subpicture functionality cannot be enabled at the same time)

Syntax changes to VVC Draft 7 are shown in the following table. The tag "<ADD>" shows the beginning of additions, and the tag "</ADD>" shows the end of those additions. The tag "<DEL>" shows the beginning of deletions (i.e., text removal), and the tag "</DEL>" shows the end of those deletions. The reference picture lists RefPicList [0] and RefPicList[1], the reference picture scaling ratios RefPicScale[i][j][0] and RefPicScale[i][j][1], and the reference picture scaled flags RefPiclsScaled[0] and RefPiclsScaled[1] are constructed as follows:

```
for( i = 0; i < 2; i++ ) {
    for( j = 0, k = 0, pocBase = PicOrderCntVal; j < num_ref_entries[ i ][ RplsIdx[ i ] ]; j++) {
        if( !inter_layer_ref_pic_flag[ i ][ RplsIdx[ i ] ][ j ] ) {
            if( st_ref_pic_flag[ i ][ RplsIdx[ i ] ][ j ] ) {
                RefPicPocList[ i ][ j ] = pocBase − DeltaPocValSt[ i ][ RplsIdx[ i ] ][ j ]
                if( there is a reference picture picA in the DPB with the same nuh_layer_id as the current picture
                        and PicOrderCntVal equal to RefPicPocList[ i ][ j ])
                    RefPicList[ i ][ j ] = picA
                else
                    RefPicList[ i ][ j ] = "no reference picture"              (200)
                pocBase = RefPicPocList[ i ][ j ]
            } else {
                if( !delta_poc_msb_cycle_lt[ i ][ k ] ) {
                    if( there is a reference picA in the DPB with the same nuh_layer_id as the current picture and
                            PicOrderCntVal & ( MaxPicOrderCntLsb − 1 ) equal to PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the current picture and
                            PicOrderCntVal equal to         FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else {
            layerIdx = DirectDependentLayerIdx[ GeneralLayerIdx[ nuh_layer_id ] ][ ilrp_idx[ i ][ RplsIdx ][ j ] ]
            refPicLayerId = vps_layer_id[ layerIdx ]
            if( there is a reference picture picA in the DPB with nuh_layer_id equal to refPicLayerId and
                    the same PicOrderCntVal as the current picture )
                RefPicList[ i ][ j ] = picA
            else
                RefPicList[ i ][ j ] = "no reference picture"
        }
        <ADD>if( ( !ref_pic_resampling_enabled_flag &&
                pps_subpic_id_signalling_present_flag &&
                subpic_treated_as_pic_flag[ i ]) ||
                ( ref_pic_resampling_enabled_flag && !subpics_present_flag ) )
        {
            RefSubpicIdList[ k ] is set equal to the subpicture ID list
            SubpicIdList[ k ] derived in the reference picture RefPicList[ i ][ j ],
            and RefSubPicIdx is derived to be such that
            RefSubpicIdList[ RefSubPicIdx ] is equal to slice_subpic_id of the
            current picture
            fRefWidth is set equal to PicOutputWidthL[ RefSubPicIdx ] of the
            reference picture RefPicList[ i ][ j ] in luma samples
            fRefHeight is set equal to PicOutputHeightL[ RefSubPicIdx ] of the
            reference picture RefPicList[ i ][ j ] in luma samples
            RefPicScale[ i ][ j ][ 0 ] = ( ( fRefWidth << 14 ) + ( PicOutputWidthL[
            SubPicIdx ] >> 1 ) ) / PicOutputWidthL[ SubPicIdx ]
            RefPicScale[ i ][ j ][ 1 ] =
            ( ( fRefHeight << 14 ) + ( PicOutputHeightL[ SubPicIdx
            ] >> 1 ) ) / PicOutputHeightL[ SubPicIdx ]
        }
```

```
        else
        {
           RefPicScale[ i ][ j ][ 0 ] = 1 << 14
           RefPicScale[ i ][ j ][ 1 ] = 1 << 14
        }</ADD>
        <DEL>fRefWidth is set equal to PicOutputWidthL of the reference picture
RefPicList[ i ][ j ] in luma samples
          fRefHeight is set equal to PicOutputHeightL of the reference picture
RefPicList[ i ][ j ] in luma samples
          RefPicScale[ i ][ j ][ 0 ] =
( ( fRefWidth << 14 ) + (PicOutputWidthL >> 1 ) ) / PicOutputWidthL
          RefPicScale[ i ][ j ][ 1 ] =
( ( fRefHeight << 14 ) + ( PicOutputHeightL >> 1 ) ) / PicOutputHeightL</DEL>
               RefPicIsScaled[ i ][ j ] = ( RefPicScale[ i ][ j ][ 0 ] != (1 << 14 ) )
| |
     ( RefPicScale[ i ][ j ][ 1 ] != (1 << 1 4 ) )
          }
}
```

According to another example, only one condition, or at least two conditions as shown below, may be used to infer the values of scaling ratios RefPicScale[i][j][0] and RefPicScale[i][j][1] to be zero:

ref_pic_resampling_enabled_flag is equal to 0 and is equal to 0 (RPR functionality and subpicture functionality are both disabled)

ref_pic_resampling_enabled_flag is equal to 0 and sps_subpic_id_present_flag is equal to 0 (RPR functionality is disabled, and subpicture ID list is not reordered in the CLVS)

ref_pic_resampling_enabled_flag is equal to 0 and sps_subpic_id_signalling_present_flag is equal to 1 (RPR functionality is disabled, and subpicture ID list is not reordered in the CLVS)

subpics_present_flag is equal to 1 and subpic_treated_as_pic_flag[i] is equal to 0 (subpicture functionality is enabled and the i-th subpicture is not treated as a picture)

ref_pic_resampling_enabled_flag is equal to 1 and sub-pics_present_flag is equal to 1 (RPR functionality and subpicture functionality cannot be enabled at the same time)

ref_pic_resampling_enabled_flag is equal to 1, sps_subpic_id_present_flag is equal to 1, and sps_subpic_id_signalling_present_flag is equal to 0 (RPR functionality and subpicture ID reordering functionality cannot be enabled at the same time).

In some examples of this disclosure, only the first four conditions may be used to infer the values of scaling ratios RefPicScale[i][j][0] and RefPicScale[i][j][1] to be zero:

According to an example of this disclosure, the scaling ratios RefPicScale[i][j][0] and RefPicScale[i][j][1] may be inferred to be equal to 1<<14 to avoid unexpected activation of the reference picture scaling process if at least one of the following conditions is true ref_pic_resampling_enabled_flag is equal to 0 and sub-pics_present_flag is equal to 0 (RPR functionality and subpicture functionality are both disabled)

ref_pic_resampling_enabled_flag is equal to 0 and sps_subpic_id_present_flag is equal to 0 (RPR functionality is disabled, and subpicture ID list is not reordered in the CLVS)

ref_pic_resampling_enabled_flag is equal to 0 and sps_subpic_id_signalling_present_flag is equal to 1 (RPR functionality is disabled, and subpicture ID list is not reordered in the CLVS)

subpics_present_flag is equal to 1 and subpic_treated_as_pic_flag[i] is equal to 0 (subpicture functionality is enabled and the i-th subpicture is not treated as a picture)

In some examples of this disclosure, only the first four conditions and the sixth condition may be used to infer the values of scaling ratios RefPicScale[i][j][0] and RefPicScale [i][j][1] to be zero:

In some examples of this disclosure, the scaling ratios RefPicScale[i][j][0] and RefPicScale[i][j][1] may be inferred to be equal to 1<<14 to avoid unexpected activation of the reference picture scaling process if at least one of the following conditions is true ref_pic_resampling_enabled_flag is equal to 0 and sub-pics_present_flag is equal to 0 (RPR functionality and subpicture functionality are both disabled)

ref_pic_resampling_enabled_flag is equal to 0 and sps_subpic_id_present_flag is equal to 0 (RPR functionality is disabled, and subpicture ID list is not reordered in the CLVS)

ref_pic_resampling_enabled_flag is equal to 0 and sps_subpic_id_signalling_present_flag is equal to 1 (RPR functionality is disabled, and subpicture ID list is not reordered in the CLVS)

subpics_present_flag equal to 1 and subpic_treated_as_pic_flag[i] is equal to 0 (subpicture functionality is enabled and the i-th subpicture is not treated as a picture)

ref_pic_resampling_enabled_flag is equal to 1, sps_sub-pic_id_present_flag is equal to 1, and sps_subpic_id_signalling_present_flag is equal to 0 (RPR functionality and subpicture ID reordering functionality cannot be enabled at the same time)

Video encoder 200 and video decoder 300 may be configured to utilize a range of reference subpicture scaling ratios. In VVC Draft 7, the range of the reference picture scaling ratios shall be in the range of 1/8 to 2, inclusive, and there are bitstream conformance constraints to apply this range to the picture widths and heights between the reference and current pictures as follows:

Let refPicWidthInLumaSamples and refPicHeightInLumaSamples be the pic_width_in_luma_samples and pic_height_in_luma_samples, respectively, of a reference picture of a current picture referring to this PPS. There may be a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

As the reference picture scaling ratios are derived by the scaling window widths and heights of each subpicture ID in the reference subpicture and the current subpicture, i.e., PicOutputWidthL[SubPicIdx], PicOutputHeightL[SubPicIdx], PicOutputWidthL[RefSubPicIdx], and PicOutputHeightL[RefSubPicIdx], the scaling ratios may be outside the range if there is no restriction to the values of PicOutputWidthL[m] and PicOutputHeightL[m], where RefSubPicIdx is derived to be such that SubpicIdList[RefSubPicIdx] of the reference picture is equal to slice_subpic_id of the current slice header referring to the current picture. Therefore, video encoder 200 and video decoder 300 may be configured to apply this range to the subpicture-based scaling window widths and heights between the reference and current pictures as follows:

RefSubPicIdx is derived to be such that SubpicIdList [RefSubPicIdx] of the reference picture is equal to slice_subpic_id of the current slice header referring to the current picture. It is required that the bitstream conformance shall satisfy all of the following conditions:

PicOutputWidthL[SubPicIdx]*A shall be greater than or equal to PicOutputWidthL[RefSubPicIdx].

PicOutputHeightL[SubPicIdx]*A shall be greater than or equal to PicOutputHeightL[RefSubPicIdx].

PicOutputWidthL[SubPicIdx] shall be less than or equal to PicOutputWidthL[RefSubPicIdx]*B.

PicOutputHeightL[SubPicIdx] shall be less than or equal to PicOutputHeightL[RefSubPicIdx]*B.

where the parameters A and B could be any non-zero positive number, and B>A. One example is A=2, and B=8.

Figure 6:
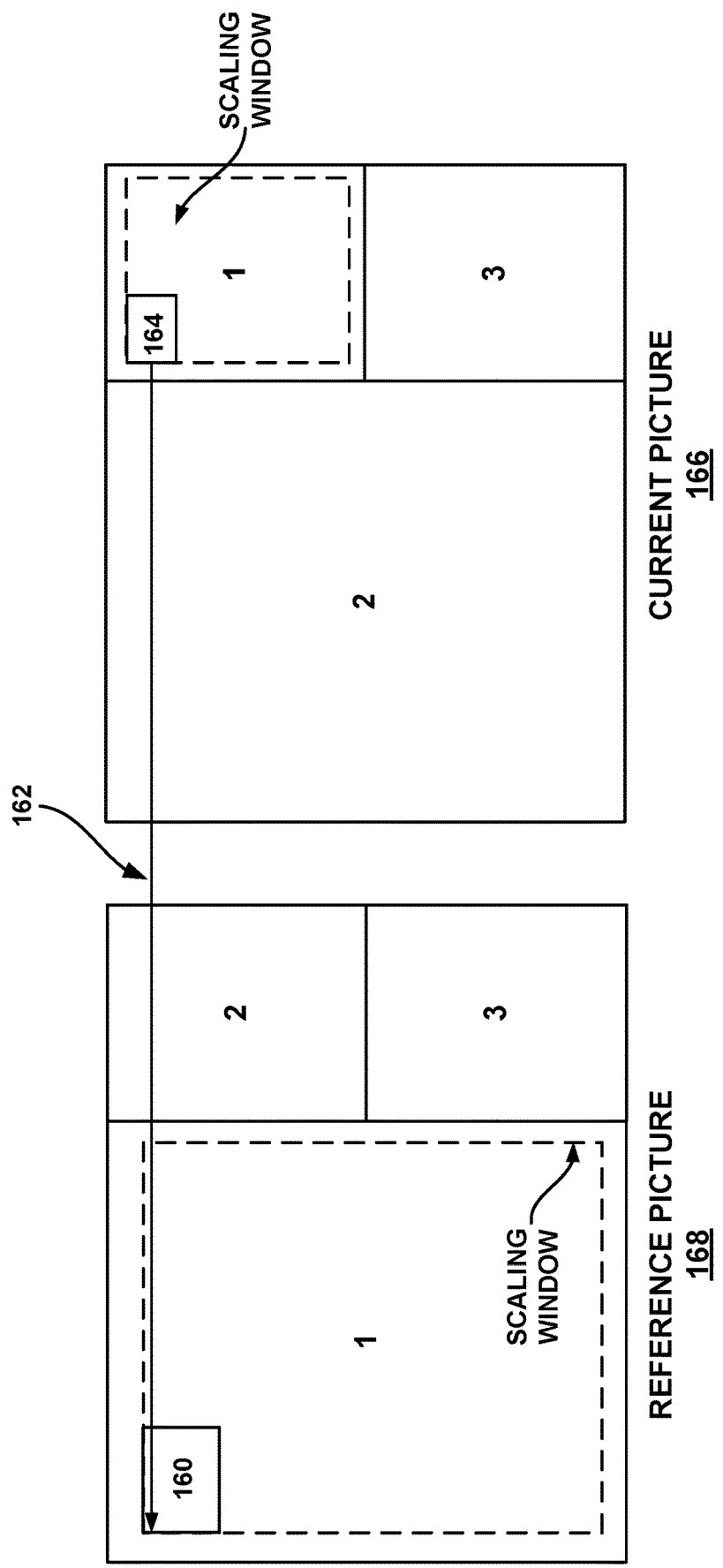
FIG. 6 shows an example of a reference block pointed to by a motion vector from the current coding block.

FIG. 6 shows an example of a reference block 160 pointed out by a motion vector 162 from the current coding block 164. Current picture 166 includes subpictures with IDs 1, 2, and 3, and reference picture 168 also includes subpictures with IDs 1, 2, and 3. Video encoder 200 and video decoder 300 may be configured to perform integer positions derivation for interpolation filtering. As shown in FIG. 6, the subpictures may use the same subpicture ID 1 to stream the same video source. If a current subpicture is treated as a picture, the coding block in the current subpicture ID 1 may refer to the block in the reference subpicture ID 1 to get the same source content for prediction as shown in FIG. 6. However, VVC Draft 7 only supports the coding block in the current subpicture ID 1 referring to the block in the reference subpicture ID 2.

This disclosure also describes techniques for adding the subpicture indexes to the scaling window offsets described in U.S. Provisional Patent Application 62/951,709, filed 20 Dec. 2019, which may align the subpicture-based scaling windows described above. The described changes are summarized as follows:

Considering the left displacement from the scaling window in the current subpicture to the scaling window in the reference subpicture, a general formula is
refPos=curPos−(curSubPicLeftBoundaryPos+cur_scaling_win_left_offset[SubPicIdx])+(refSubPicLeftBoundaryPos+ref_scaling_win_left_offset[RefSubPicIdx])

refPos: Top-left position of the scaling window in the reference subpicture curPos: Top-left position of the scaling window in the current subpicture curSubPicLeftBoundaryPos: the boundary left position in the current subpicture, i.e., SubPicLeftBoundaryPos derived in the current subpicture refSubPicLeftBoundaryPos: the boundary left position in the reference subpicture, i.e., SubPicLeftBoundaryPos derived in the reference subpicture cur_scaling_win_left_offset[SubPicIdx]: scaling_win_left_offset[SubPicIdx] of the current subpicture ref_scaling_win_left_offset[RefSubPicIdx]: scaling_win_left_offset[RefSubPicIdx] of the reference subpicture It is the same for the top displacement from the scaling window in the current subpicture to the scaling window in the reference subpicture.

Syntax changes to VVC Draft 7 are shown in the following table. The tag "<ADD>" shows the beginning of additions, and the tag "</ADD>" shows the end of those additions. The tag "<DEL>" shows the beginning of deletions (i.e., text removal), and the tag "</DEL>" shows the end of those deletions.

---

<DEL>The variable fRefLeftOffset is set equal to (scaling_win_left_offset << 10 ), where scaling_win_left_offset is the scaling_win_left_offset for the reference picture.

The variable fRefTopOffset is set equal to (scaling_win_top_offset << 10 ), where scaling_win_top_offset is the scaling_win_top_offset for the reference picture. </DEL>

<ADD>The variables leftBoundaryOffset is set equal to scaling_win_left_offset[ SubPicIdx ], topBoundaryOffset is set equal to scaling_win_top_offset[ SubPicIdx ], refSubPicLeftBoundaryPos, and refSubPicTopBoundaryPos are set equal to 0.

If subpic_treated_as_pic_flag[ SubPicIdx ] is equal to 1, the following applies
leftBoundaryOffset += SubPicLeftBoundaryPos
topBoundaryOffset += SubPicTopBoundaryPos
RefSubPicIdx is derived to be such that SubpicIdList[ RefSubPicIdx ] of the reference picutre is equal to slice_subpic_id.
refSubPicLeftBoundaryPos = subpic_ctu_top_left_x[ RefSubPicIdx ] * CtbSizeY
refSubPicTopBoundaryPos = subpic_ctu_top_left_y[ RefSubPicIdx ] *CtbSizeY
The variable fRefLeftOffset is set equal to
(( scaling_win_left_offset[ RefSubPicIdx ] + refSubPicLeftBoundaryPos) << 10 ), where scaling_win_left_offset[ i ] is the scaling_win_left_offset[ i ] for the reference picture.

The variable fRefTopOffset is set equal to
(( scaling_win_top_offset[ RefSubPicIdx ] + refSubPicTopBoundaryPos) << 10 ),
where scaling_win_top_offset[ i ] is the scaling_win_top_offset[ i ] for the reference picture. </ADD>
...
- If cIdx is equal to 0, the following applies:
  - For each luma sample location
    ( $x_L$ = 0..sbWidth − 1 + brdExtSize, $y_L$ = 0..sbHeight − 1 + brdExtSize ) inside the prediction luma sample array predSamplesLX, the corresponding prediction luma sample value predSamplesLX[ $x_L$ ][ $y_L$ ] is derived as follows:
    - Let ( $refxSb_L$, $refySb_L$ ) and ( $refx_L$, $refy_L$ ) be luma locations pointed to by a motion vector ( refMvLX[0], refMvLX[1] ) given in 1/16-sample units. The variables $refxSb_L$, $refx_L$, $refySb_L$, and $refy_L$ are derived as follows:
      $refxSb_L$ = ( ( ( xSb − <ADD>leftBoundaryOffset</ADD> ) << 4 ) + refMvLX[ 0 ] ) * scalingRatio[ 0 ]     (937)
      $refx_L$ = ( ( Sign( $refxSb_L$ ) * ( ( Abs( $refxSb_L$ ) + 128 ) >> 8 ) + $x_L$ * ( ( scalingRatio[ 0 ] + 8) >> 4 ) ) + fRefLeftOffset + 32 ) >> 6     (938)
      $refySb_L$ = ( ( ( ySb − <ADD>topBoundaryOffset</ADD> ) << 4 ) + refMvLX[ 1 ] ) * scalingRatio[ 1 ]     (939)
      $refy_L$ = ( ( Sign( $refySb_L$ ) * ( ( Abs( $refySb_L$ ) + 128 ) >> 8 ) + yL * ( ( scalingRatio[ 1 ] + 8) >> 4 ) ) + fRefTopOffset + 32 ) >> 6     (940)

In implementing the techniques above, video decoder 300 may be configured to determine that a first subpicture of a current picture has associated scaling parameters (e.g., pps_scaling_win_left_offset[i], pps_scaling_win_right_offset[i], pps_scaling_win_top_offset[i], and pps_scaling_win_bottom_offset[i]); in response to determining that the first subpicture of the current picture has the associated scaling parameters, receive the associated scaling parameters for the first subpicture of the current picture; determine motion information, for a block of the first subpicture of the current picture, that identifies a subpicture of a reference picture; locate a prediction block for the block of the first subpicture of the current picture in the subpicture of the reference picture; and scale the prediction block based on the associated scaling parameters for the first subpicture of the current picture.

In accordance with the techniques of this disclosure, a method includes determining if a subpicture of the video data is to be treated as a picture, based on the subpicture being treated as a picture, scaling the subpicture as a picture, based on the subpicture not being treated as a picture, determining a subpicture scaling flag, and coding the subpicture based on the scaling or the subpicture scaling flag.

In accordance with the techniques of this disclosure, a method includes determining if a subpicture of the video data is to be treated as a picture, based on the subpicture being treated as a picture, determining a first scaling ratio, based on the subpicture not being treated as a picture, determining a second scaling ratio, and coding the subpicture based on the first scaling ratio or the second scaling ratio.

In accordance with the techniques of this disclosure, a method includes restricting PicOutputWidthL*A to be greater than or equal to refPicOutputWidthL, restricting PicOutputHeightL*A to be greater than or equal to refPicOutputHeightL, restricting PicOutputWidthL to be less than or equal to refPicOutputWidthL*B, restricting PicOutputHeightL shall be less than or equal to refPicOutputHeightL*B, and coding the video data based on the restrictions, wherein A is a non-zero positive number, B is a non-zero positive number, and B>A.

In accordance with the techniques of this disclosure, a method includes restricting PicOutputWidthL*A to be greater than or equal to refPicOutputWidthL, restricting PicOutputHeightL*A to be greater than or equal to refPicOutputHeightL, restricting PicOutputWidthL to be less than or equal to refPicOutputWidthL*B, restricting PicOutputHeightL shall be less than or equal to refPicOutputHeightL*B, and coding the video data based on the restrictions, wherein A is a non-zero positive number, B is a non-zero positive number, and B>A.

In accordance with the techniques of this disclosure, a method includes determining a left displacement from a scaling window in a current subpicture of the video data to a scaling window in a reference subpicture in the video data, determining a top displacement from a scaling window in the current subpicture to a scaling window in the reference subpicture, and coding the current subpicture based on the left displacement and the top displacement.

In accordance with the techniques of this disclosure, a device includes a memory configured to store video data coupled to one or more processors implemented in circuitry and configured to perform any of the techniques of this disclosure.

In accordance with the techniques of this disclosure, a device includes one or more means for performing any of the techniques of this disclosure.

In accordance with the techniques of this disclosure, a computer-readable storage medium is encoded with instructions that, when executed, cause a programmable processor to perform any of the techniques of this disclosure.

Video encoder 200 represents an example of a device configured to encode video data including a memory configured to store video data, and one or more processing units implemented in circuitry and configured to determine if a subpicture of the video data is to be treated as a picture, based on the subpicture being treated as a picture, scale the subpicture as a picture, based on the subpicture not being treated as a picture, determine a subpicture scaling flag, and encode the subpicture based on the scaling or the subpicture scaling flag.

Video encoder 200 also represents an example of a device configured to encode video data including a memory configured to store video data, and one or more processing units implemented in circuitry and configured to determine if a subpicture of the video data is to be treated as a picture, based on the subpicture being treated as a picture, determine a first scaling ratio, based on the subpicture not being treated as a picture, determine a second scaling ratio, and encode the subpicture based on the first scaling ratio or the second scaling ratio.

Video encoder 200 also represents an example of a device configured to encode video data including a memory configured to store video data, and one or more processing units implemented in circuitry and configured to restrict PicOutputWidthL*A to be greater than or equal to refPicOutputWidthL, restrict PicOutputHeightL*A to be greater than or equal to refPicOutputHeightL, restrict PicOutputWidthL to be less than or equal to refPicOutputWidthL*B, restrict PicOutputHeightL shall be less than or equal to refPicOutputHeightL*B, and encode the video data based on the restrictions, wherein A is a non-zero positive number, B is a non-zero positive number, and B>A.

Video encoder 200 also represents an example of a device configured to encode video data including a memory configured to store video data, and one or more processing units implemented in circuitry and configured to restrict PicOutputWidthL*A to be greater than or equal to refPicOutputWidthL, restrict PicOutputHeightL*A to be greater than or equal to refPicOutputHeightL, restrict PicOutputWidthL to be less than or equal to refPicOutputWidthL*B, restrict PicOutputHeightL shall be less than or equal to refPicOutputHeightL*B, and encode the video data based on the restrictions, wherein A is a non-zero positive number, B is a non-zero positive number, and B>A.

Video encoder 200 also represents an example of a device configured to encode video data including a memory configured to store video data, and one or more processing units implemented in circuitry and configured to determine a left displacement from a scaling window in a current subpicture of the video data to a scaling window in a reference subpicture in the video data, determine a top displacement from a scaling window in the current subpicture to a scaling window in the reference subpicture, and encode the current subpicture based on the left displacement and the top displacement.

In this manner, video decoder 300 represents an example of a video decoding device including a memory configured to store video data, and one or more processing units implemented in circuitry and configured to determine if a subpicture of the video data is to be treated as a picture, based on the subpicture being treated as a picture, scale the subpicture as a picture, based on the subpicture not being treated as a picture, determine a subpicture scaling flag, and decode the subpicture based on the scaling or the subpicture scaling flag.

Video decoder 300 also represents an example of a video decoding device including a memory configured to store video data, and one or more processing units implemented in circuitry and configured to determine if a subpicture of the video data is to be treated as a picture, based on the subpicture being treated as a picture, determine a first scaling ratio, based on the subpicture not being treated as a picture, determine a second scaling ratio, and decode the subpicture based on the first scaling ratio or the second scaling ratio.

Video decoder 300 also represents an example of a video decoding device including a memory configured to store video data, and one or more processing units implemented in circuitry and configured to a method includes restrict PicOutputWidthL*A to be greater than or equal to refPicOutputWidthL, restrict PicOutputHeightL*A to be greater than or equal to refPicOutputHeightL, restrict PicOutputWidthL to be less than or equal to refPicOutputWidthL*B, restrict PicOutputHeightL shall be less than or equal to refPicOutputHeightL*B, and decode the video data based on the restrictions, wherein A is a non-zero positive number, B is a non-zero positive number, and B>A.

Video decoder 300 also represents an example of a video decoding device including a memory configured to store video data, and one or more processing units implemented in circuitry and configured to restrict PicOutputWidthL*A to be greater than or equal to refPicOutputWidthL, restrict PicOutputHeightL*A to be greater than or equal to refPicOutputHeightL, restrict PicOutputWidthL to be less than or equal to refPicOutputWidthL*B, restrict PicOutputHeightL shall be less than or equal to refPicOutputHeightL*B, and decode the video data based on the restrictions, wherein A is a non-zero positive number, B is a non-zero positive number, and B>A.

Video decoder 300 also represents an example of a video decoding device including a memory configured to store video data, and one or more processing units implemented in circuitry and configured to determine a left displacement from a scaling window in a current subpicture of the video data to a scaling window in a reference subpicture in the video data, determine a top displacement from a scaling window in the current subpicture to a scaling window in the reference subpicture, and decode the current subpicture based on the left displacement and the top displacement.

Figure 7:
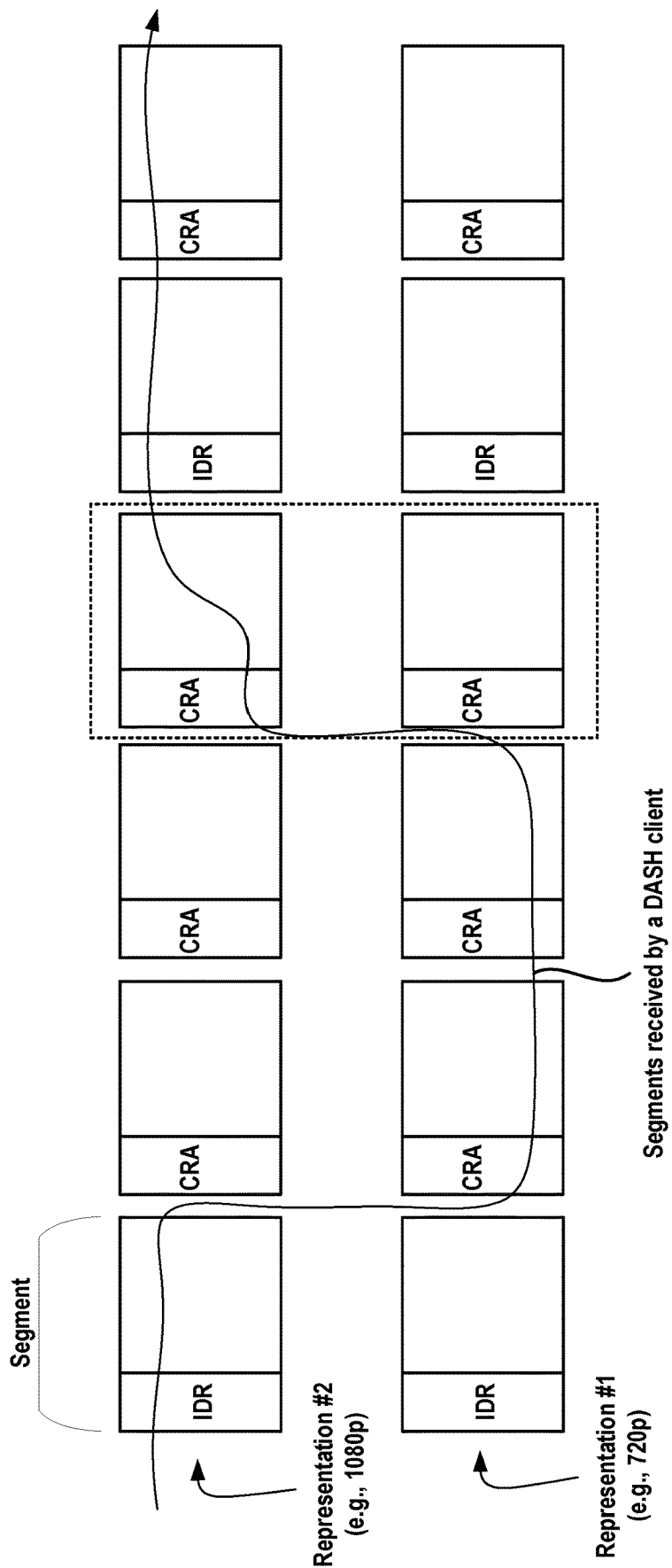
FIG. 7 is a conceptual diagram illustrating adaptive streaming in an open group of picture (GOP) structure.
Figure 8:
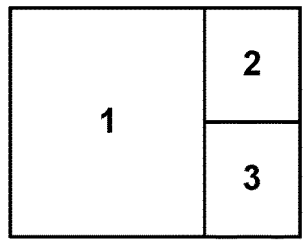
FIG. 8 is a conceptual diagram illustrating a reference picture and a current picture with reference picture resampling (RPR) enabled and subpicture enabled at the same time, where subpicture ID is not reordered.
Figure 8:
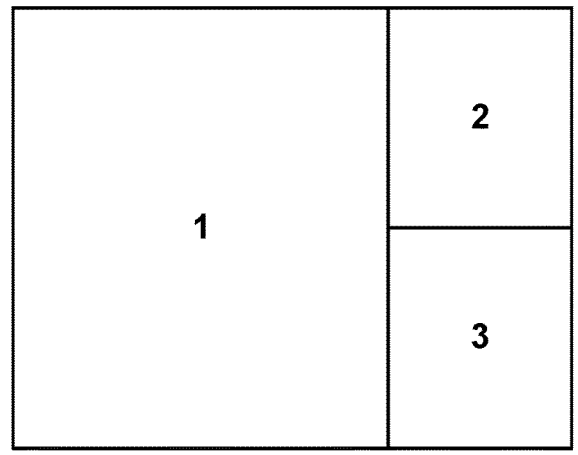
Figure 9:
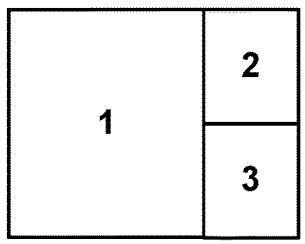
FIG. 9 is a conceptual diagram illustrating a reference picture and a current picture with RPR enabled and subpicture enabled at the same time, where subpicture ID is reordered.
Figure 9:
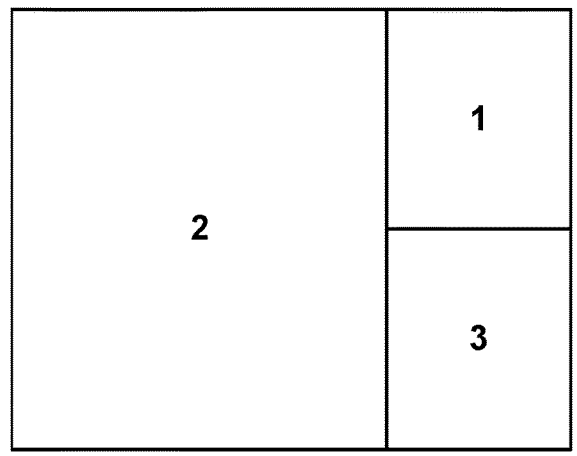

Reference picture resampling (RPR) was adopted into the VVC standard to support an adaptive streaming in an open group of picture (GOP) prediction structure (starting with CRA picture) as shown in FIG. 7. Another subpicture functionality was also adopted into the VVC standard to support the extraction and merging of subpictures in the use cases of 360 streaming, video conferencing, etc. VVC Draft 7 only enables RPR in a regular picture. If the subpicture functionality is working, the RPR functionality is disabled. The present disclosure would like to investigate both RPR and the subpicture are enabled at the same time. In other words, with the techniques of this disclosure, video encoder 200 and video decoder 300 may enable both RPR and subpictures. This allows an adaptive subpicture streaming in a GOP prediction structure, and shares the same benefits as those of RPR in the regular picture use cases that may obtain better compression performance and better subjectively visual quality compared to a traditionally closed GOP prediction structure. FIGS. 8 and 9 illustrate the cases of RPR and subpicture enabled at the same time that this disclosure describes.

This disclosure describes the topic in addition to U.S. Provisional Patent Application No. 62/953,015, filed on Dec. 23, 2019, and hereby incorporated in its entirety by reference, in which techniques allow the reference subpicture scaling process for a current subpicture to scale up or scale down a reference subpicture using the same subpicture ID as shown in FIG. 3 above. This disclosure would like to maintain two categories of scaling processes, one uses the scaling window and the scaling ratio for the regular pictures, and another uses the subpicture scaling window and the subpicture scaling ratio for the subpictures. For example, video encoder 200 and video decoder 300 may use a scaling window and scaling ratio for regular pictures and a subpicture scaling window and a subpicture scaling ratio for subpictures.

Video encoder 200 and video decoder 300 may be configured to implement subpicture-based scaling windows. In VVC Draft 7, a reference picture scaling process is used when the reference picture size and the current picture size are different, and is extracted from VVC Draft 7 clause 8.3.2 as follows:

```
RefPicScale[ i ][ j ][ 0 ] =
  ( ( fRefWidth << 14 ) + ( PicOutputWidthL >> 1 ) ) / PicOutputWidthL
RefPicScale[ i ][ j ][ 1 ] =
  ( ( fRefHeight << 14 ) + ( PicOutputHeightL >> 1 ) ) / PicOutputHeightL
``` where fRefWidth and fRefHeight are set equal to PicOutputWidthL and PicOutputHeightL of the reference picture RefPicList[i][j] in luma samples, respectively. PicOutputWidthL and PicOutputHeightL are the scaling window width and height as shown in FIG. 2, and are cropped from the picture width and height as shown below:

```
PicOutputWidthL = pic_width_in_luma_samples − ( scaling_win_right_offset +
  scaling_win_left_offset )
PicOutputHeightL = pic_height_in_luma_samples − ( scaling_win_bottom_offset +
  scaling_win_top_offset )
```

Video encoder 200 and video decoder 300 may use a scaling window avoid location misalignment in the reference picture scaling process. Video encoder 200 and video decoder 300 may be configured to signal one scaling window for the regular picture scaling process and various subpicture scaling windows for a subpicture scaling process. For example, video encoder 200 may signal one scaling window for a regular picture scaling process and different subpicture scaling windows for a subpicture scaling process. Video decoder 300 may determine the signal by reading the signal. When the current subpicture is not treated as a picture, the same reference picture scaling process is used for the current subpicture as shown in FIG. 4. When the current subpicture is treated as a picture, a subpicture scaling window is applied to the subpictures using the same ID. Therefore, the modifications on top of the VVC Draft 7 specification are as follows:

Each subpicture signals a scaling window flag, e.g. pps_scaling_window_flag[i]. If the i-th flag pps_scaling_window_flag[i] is equal to 1, the scaling window offsets, pps_scaling_win_left_offset[i], pps_scaling_win_right_offset[i], pps_scaling_win_top_offset[i], and pps_scaling_win_bottom_offset[i] are signaled for the i-th subpicture.

The number of subpictures in the CLVS shall be signaled at PPS before a group of the subpicture scaling window parameters is signaled.

The value of pps_scaling_window_flag[i] shall be inferred to be 0 to avoid unexpected activation of the subpicture scaling process if at least one of the following conditions is true
- subpics_present_flag is equal to 0 (subpicture functionality is disabled)
- ref_pic_resampling_enabled_flag is equal to 0 and sps_subpic_id_present_flag is equal to 0 (RPR functionality is disabled, and subpicture ID list is not reordered in the CLVS)
- ref_pic_resampling_enabled_flag is equal to 0 and sps_subpic_id_signalling_present_flag is equal to 1 (RPR functionality is disabled, and subpicture ID list is not reordered in the CLVS)
- subpics_present_flag is equal to 1 and subpic_treated_as_pic_flag[i] is equal to 0 (subpicture functionality is enabled and the i-th subpicture is not treated as a picture)

pps_scaling_win_left_offset[i]+pps_scaling_win_right_offset[i] subpic_width_in_luma_samples[i], where subpic_width_in_luma_samples[i] is the width for the i-th subpicture.

pps_scaling_win_top_offset[i]+pps_scaling_win_bottom_offset[i] subpic_height_in_luma_samples[i], where subpic_height_in_luma_samples[i] is the height for the i-th subpicture.

Subpicture-based scaling window parameters are signaled in both PPS, e.g. pps_scaling_win_left_offset[i], pps_scaling_win_right_offset[i], pps_scaling_win_top_offset[i], and pps_scaling_win_bottom_offset[i], and PH, e.g. ph_scaling_win_left_offset[i], ph_scaling_win_right_offset[i], ph_scaling_win_top_offset[i], and ph_scaling_win_bottom_offset[i]. Based on the scaling window flag in PH, i.e., ph_scaling_window_flag[i], the parameters in PH can override the parameter in PPS, e.g. scaling_win_left_offset[i]= (ph_scaling_window_flag[i])? ph_scaling_win_left_offset[i]: pps_scaling_win_left_offset[i].

In one example, the subpicture-based scaling window parameters are only signaled in PPS by video encoder 200. In another example, the subpicture-based scaling window parameters are only signaled in PH by video encoder 200.

Scaling window width and height for the i-th subpicture are derived by cropping the i-th subpicture with the i-th scaling window offsets as follows:

```
PicOutputWidthL[ i ] = subpic_width_in_luma_samples[ i ] − (
  scaling_win_right_offset[ i ] + scaling_win_left_offset[ i ] )
PicOutputHeightL[ i ] = subpic_height_in_luma_samples[ i ] − (
  scaling_win_bottom_offset[ i ] + scaling_win_top_offset[ i ] )
```

Syntax changes to VVC Draft 7 are shown in the following table. The beginning of additions are marked <ADD> and the end of additions are marked </ADD>. The beginning of deletions are marked <DELETE> and the end of deletions are marked </DELETE>.

| | Descriptor |
|---|---|
| pic_parameter_set_rbsp( ) { | |
| ... | |
|   pic_width_in_luma_samples | ue(v) |
|   pic_height_in_luma_samples | ue(v) |
| ... | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
| <ADD> pps_num_subpics_minus1 | ue(v) |
|   for( i = 0; i <= pps_num_subpics_minus1; i++ ) { | |
|     pps_scaling_window_flag[ i ] | u(1) |
|     if( pps_scaling_window_flag[ i ] ) { | |
|       pps_scaling_win_left_offset[ i ] | ue(v) |
|       pps_scaling_win_right_offset[ i ] | ue(v) |
|       pps_scaling_win_top_offset[ i ] | ue(v) |
|       pps_scaling_win_bottom_offset[ i ] | ue(v) |
|     } | |

| Descriptor |
| --- |
| }</ADD> |
| ... |
| pps_subpic_id_signalling_present_flag   u(1) |
| if( pps_subpics_id_signalling_present_flag ) { |
| <DELETE> pps_num_subpics_minus1   ue(v)</DELETE> |
|   pps_subpic_id_len_minus1   ue(v) |
|   for( i = 0; i <= pps_num_subpic_minus1; i++ ) |
|     pps_subpic_id[ i ]   u(v) |
| } |
| ... |

Section 7.4.3.4 in VVC Draft 7 may be modified as follows:

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1 or ref_pic_resampling_enabled_flag_equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1 or ref_pic_resampling_enabled_flag equal to 0, the value of pic_height_in_luma_samples shall be equal to pic_height_max_in_luma_samples.

scaling_win_left_offset, scaling_win_right_offset, scaling_win_top_offset, and scaling_win_bottom_offset specify the offsets, in units of luma samples, that are applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The value of scaling_win_left_offset+scaling_win_right_offset shall be less than pic_width_in_luma_samples, and the value of scaling_win_top_offset+scaling_win_bottom_offset shall be less than pic_height_in_luma_samples.

The variables PicOutputWidthL and PicOutputHeightL are derived as follows:

PicOutputWidthL = pic_width_in_luma_samples − (74)
  ( scaling_win_right_offset + scaling_win_left_offset )
PicOutputHeightL = pic_height_in_luma_samples − (75)
  ( scaling_win_bottom_offset + scaling_win_top_offset )

<ADD>pps_num_subpics_minus1 plus 1 specifies the number of subpictures in the coded pictures referring to the PPS.

It is a requirement of bitstream conformance that the value of pps_num_subpic_minus 1 shall be equal to sps_num_subpics_minus 1.

pps_scaling_window_flag[i] equal to 1 specifies that the scaling window offset parameters for the i-th subpicture are present in the PPS. pps_scaling_window_flag[i] equal to 0 specifies that the scaling window offset parameters are not present for the i-th subpicture in the PPS. The value of pps_scaling_window_flag[i] shall be inferred to be 0 if one of the following conditions is true:

subpics_present_flag is equal to 0
  ref_pic_resampling_enabled_flag is equal to 0 and sps_subpic_id_present_flag is equal to 0
  ref_pic_resampling_enabled_flag is equal to 0 and sps_subpic_id_signalling_present_flag is equal to 1
  subpics_present_flag is equal to 1 and subpic_treated_as_pic_flag[i] is equal to 0 pps_scaling_win_left_offset[i], pps_scaling_win_right_offset[i], pps_scaling_win_top_offset[i], and pps_scaling_win_bottom_offset[i] specify the offsets, in units of luma samples, that are applied to the picture size for scaling ratio calculation of the i-th subpicture. When pps_scaling_window_flag[i] is equal to 0, the values of pps_scaling_win_left_offset[i], pps_scaling_win_right_offset[i], pps_scaling_win_top_offset[i], and pps_scaling_win_bottom_offset[i] are inferred to be equal to 0.

The width and height of the i-th subpicture is derived as follows:

```
subpic_width_in_luma_samples[ i ] = Min( pic_width_in_luma_samples, (
subpic_ctu_top_left_x[ i ] + subpic_width_minus1[ i ] + 1 ) * CtbSizeY ) −
subpic_ctu_top_left_x[ i ] * CtbSizeY
subpic_height_in_luma_samples[ i ] = Min( pic_height_in_luma_samples, (
subpic_ctu_top_left_y[ i ] + subpic_height_minus1[ i ] + 1 ) * CtbSizeY ) −
subpic_ctu_top_left_y[ i ] * CtbSizeY
```

The value of pps_scaling_win_left_offset[i]+pps_scaling_win_right_offset[i] shall be less than subpic_width_in_luma_samples[i], and the value of pps_scaling_win_top_offset[i]+pps_scaling_win_bottom_offset[i] shall be less than subpic_height_in_luma_samples[i].</ADD>

Section 7.3.2.6 in VVC Draft 7 may be modified as follows:

|  | Descriptor |
|---|---|
| Picture_header_rbsp( ){ <br> ... <br> <ADD>If( (!ref_pic_resampling_enabled_flag && pps_subpic_id_signalling_present_flag && <br>    subpic_treated_as_pic_flag[ i ] ) \|\| <br> (ref_pic_resampling_enabled_flag && <br>    subpics_present_flag && subpic_treated_as_pic_flag[ i ]) ) { <br>  for( i = 0; i <= sps_num_subpics_minus1; i++ ) { <br>    ph_scaling_window_flag[ i ] <br>    if( ph_scaling_window_flag[ i ] ) { <br>      ph_scaling_win_left_offset[ i ] <br>      ph_scaling_win_right_offset[ i ] <br>      ph_scaling_win_top_offset[ i ] <br>      ph_scaling_win_bottom_offset[ i ] <br>    } <br>  } <br> } </ADD> <br> ... |  <br>  <br>  <br>  <br>  <br>  <br>  <br> u(1) <br>  <br> ue(v) <br> ue(v) <br> ue(v) <br> ue(v) |

Section 7.4.3.6 in VVC Draft 7 may be modified as follows: <ADD>ph_scaling_window_flag[i] equal to 1 specifies that the scaling window offset parameters for the i-th subpicture are present in the PH. ph_scaling_window_flag[i] equal to 0 specifies that the scaling window offset parameters for the i-th subpicture are not present in the PH. If not present, the value of ph_scaling_window_flag[i] shall be inferred to be 0.

ph_scaling_win_left_offset[i], ph_scaling_win_right_offset[i], ph_scaling_win_top_offset[i], and ph_scaling_win_bottom_offset[i] specify the offsets, in units of luma samples, that are applied to the picture size of the i-th subpicture for scaling ratio calculation. When ph_scaling_window_flag[i] is equal to 0, the values of ph_scaling_win_left_offset[i], ph_scaling_win_right_offset[i], ph_scaling_win_top_offset[i], and ph_scaling_win_bottom_offset[i] are inferred to be equal to 0.

The value of ph_scaling_win_left_offset[i]+ph_scaling_win_right_offset[i] shall be less than subpic_width_in_luma_samples[i], and the value of ph_scaling_win_top_offset[i]+ph_scaling_win_bottom_offset[i] shall be less than subpic_height_in_luma_samples[i].

The variables scaling_win_left_offset[i], scaling_win_right_offset[i], scaling_win_top_offset[i], and scaling_win_bottom_offset[i] are derived as follows:

```
scaling_win_left_offset[ i ] = ph_scaling_window_flag[ i ] ?
ph_scaling_win_left_offset[ i ] : pps_scaling_win_left_offset[ i ]
scaling_win_right_offset[ i ] = ph_scaling_window_flag[ i ] ?
ph_scaling_win_right_offset[ i ] : pps_scaling_win_ right_offset[ i ]
scaling_win_top_offset[ i ] = ph_scaling_window_flag[ i ] ? ph_scaling_win_
top_offset[ i ] : pps_scaling_win_ top_offset[ i ]
scaling_win_bottom_offset[ i ] = ph_scaling_window_flag[ i ] ?
ph_scaling_win_bottom_offset[ i ] : pps_scaling_win_ bottom_offset[ i ]
```

The variables PicOutputWidthL[i] and PicOutputHeightL[i] are derived as follows:

```
PicOutputWidthL[ i ] = subpic_weight_in_luma_samples[ i ] −
    (scaling_win_right_offset[ i ] + scaling_win_left_offset[ i ] )
PicOutputHeightL[ i ] = subpic_height_in_luma_samples[ i ] −
    (scaling_win_bottom_offset[ i ] + scaling_win_top_offset[ i
] )
```
</ADD>

Video encoder 200 and video decoder 300 may be configured to perform derivation of the reference subpicture scaling ratio. Video encoder 200 and video decoder 300 may be configured to derive two separate scaling ratios, e.g., one for the regular pictures and another for the subpictures. For example, video encoder 200 and video decoder 300 may use one scaling ratio for regular pictures and another scaling ratio for subpictures. When the current subpicture is not treated as a picture, the current reference picture scaling process in VVC is used for the current picture or the current subpicture. When the current subpicture is treated as a picture, a subpicture scaling window is applied as follows:

--- fRefWidth and fRefHeight are defined as PicOutputWidthL[ RefSubPicIdx ] and
 PicOutputHeightL[ RefSubPicIdx ] of the reference picture RefPicList[ i ][ j ] in
 luma samples, respectively, where RefSubPicIdx is derived to be such that
 SubpicIdList[ RefSubPicIdx ] of the reference picture RefPicList[ i ][ j ] is equal
 to slice_subpic_id of the current slice. Then the scaling ratios are derived as
 follows:
RefPicScale[ i ][ j ][ 0 ] = ( ( fRefWidth << 14 ) + ( PicOutputWidthL[ SubPicIdx ] >>
 1 ) ) / PicOutputWidthL[ SubPicIdx ]
RefPicScale[ i ][ j ][ 1 ] = ( ( fRefHeight << 14 ) + ( PicOutputHeightL[ SubPicIdx ]
 >> 1 ) ) / PicOutputHeightL[ SubPicIdx ]
where SubPicIdx is derived to be such that SubpicIdList[ SubPicIdx ] of the current
picture is equal to slice_subpic_id of the current slice.

---

25

Syntax changes to VVC Draft 7 are shown in the following table. The beginning of additions are marked <ADD> and the end of additions are marked </ADD>. The beginning of deletions are marked <DELETE> and the end of deletions are marked </DELETE>.

---

The reference picture lists RefPicList[ 0 ] and RefPicList[ 1 ], the reference picture
scaling ratios RefPicScale[ i ][ j ][ 0 ] and RefPicScale[ i ][ j ][ 1 ], and the reference
picture scaled flags RefPicIsScaled[ 0 ] and RefPicIsScaled[ 1 ] are constructed as
follows:
    for( i = 0; i < 2; i++ ) {
        for( j = 0. k = 0, pocBase = PicOrderCntVal; j < num_ref_entries[ i ][ RplsIdx[ i ] ]; j++) {
            if( !inter_layer_ref_pic_flag[ i ][ RplsIdx[ i ] ][ j ] ) {
                if( st_ref_pic_flag[ i ][ RplsIdx[ i ] ][ j ] ) {
                    RefPicPocList[ i ][ j ] = pocBase − DeltaPocValSt[ i ][ RplsIdx[ i ] ][ j ]
                    if( there is a reference picture picA in the DPB with the same nuh_layer_id as the
current picture
                            and PicOrderCntVal equal to RefPicPocList[ i ][ j ] )
                        RefPicList[ i ][ j ] = picA
                    else
                        RefPicList[ i ][ j ] = "no reference picture"           (200)
                    pocBase = RefPicPocList[ i ][ j ]
                } else {
                    if( !delta_poc_msb_cycle_lt[ i ][ k ] ) {
                        if( there is a reference picA in the DPB with the same nuh_layer_id as the
current picture and
                            PicOrderCntVal & (MaxPicOrderCntLsb − 1) equal to
PocLsbLt[ i ][ k ])
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the
current picture and
                            PicOrderCntVal equal to FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else {
            layerIdx =

-continued

```
                DirectDependentLayerIdx[ GeneralLayerIdx[ nuh_layer_id ] ][ ilrp_idx[ i ][ RplsIdx ][ j ] ]
                    refPicLayerId = vps_layer_id[ layerIdx ]
                    if( there is a reference picture picA in the DPB with nuh_layer_id equal to
refPicLayerId and
                                    the same PicOrderCntVal as the current picture )
                        RefPicList[ i ][ j ] = picA
                    else
                        RefPicList[ i ][ j ] = "no reference picture"
            }
            <ADD> if( ( !ref_pic_resampling_enabled_flag &&
            pps_subpic_id_signalling_present_flag &&
                    subpic_treated_as_pic_flag[ i ]) || ( ref_pic_resampling_enabled_flag &&
                    subpics_present_flag && subpic_treated_as_pic_flag[ i ]) )
            {
              RefSubpicIdList[ k ] is set equal to the subpicture ID list SubpicIdList[ k ] derived
              in the reference picture RefPicList[ i ][ j ], and RefSubPicIdx is derived to be such
              that RefSubpicIdList[ RefSubPicIdx ] is equal to slice_subpic_id of the current
              picture
              fRefWidth is set equal to PicOutputWidthL[ RefSubPicIdx ] of the reference
              picture RefPicList[ i ][ j ] in luma samples
              fRefHeight is set equal to PicOutputHeightL[ RefSubPicIdx ] of the reference
              picture RefPicList[ i ][ j ] in luma samples
              RefPicScale[ i ][ j ][ 0 ] = ( ( fRefWidth << 14 ) + (PicOutputWidthL[ SubPicIdx
              ] >> 1 ) ) / PicOutputWidthL[ SubPicIdx ]
              RefPicScale[ i ][ j ][ 1 ] = ( ( fRefHeight << 14 ) + (PicOutputHeightL[
              SubPicIdx ] >> 1 ) ) / PicOutputHeightL[ SubPicIdx ]
            }
            else if( ref_pic_resampling_enabled_flag)
            {
              fRefWidth is set equal to PicOutputWidthL of the reference picture
              RefPicList[ i ][ j ] in luma samples
              fRefHeight is set equal to PicOutputHeightL of the reference picture
              RefPicList[ i ][ j ] in luma samples
              RefPicScale[ i ][ j ][ 0 ] =
              ( ( fRefWidth << 14 ) + (PicOutputWidthL >> 1 ) ) / PicOutputWidthL
              RefPicScale[ i ][ j ][ 1 ] =
              ( ( fRefHeight << 14 ) + (PicOutputHeightL >> 1 ) ) / PicOutputHeightL
            }
            else
            {
              RefPicScale[ i ][ j ][ 0 ] = 1 << 14
              RefPicScale[ i ][ j ][ 1 ] = 1 << 14
            }</ADD>
            <DELETE> fRefWidth is set equal to PicOutputWidthL of the reference picture
RefPicList[ i ][ j ] in luma samples
            fRefHeight is set equal to PicOutputHeightL of the reference picture RefPicList[ i ][ j ]
in luma samples
            RefPicScale[ i ][ j ][ 0 ] =
( ( fRefWidth << 14 ) + (PicOutputWidthL >> 1 ) ) / PicOutputWidthL
            RefPicScale[ i ][ j ][ 1 ] =
( ( fRefHeight << 14 ) + (PicOutputHeightL >> 1 ) ) / PicOutputHeightL </DELETE>
            RefPicIsScaled[ i ][ j ] = (RefPicScale[ i ][ j ][ 0 ] != (1 << 14 ) ) | |
                    (RefPicScale[ i ][ j ][ 1 ] != (1 << 14 ) )
        }
}
```

Video encoder 200 and video decoder 300 may be configured to restrict reference subpicture scaling ratios to a range.

In VVC Draft 7, the range of the reference picture scaling ratios shall be in the range of 1/8 to 2, inclusive, and there are bitstream conformance to apply this range to the picture widths and heights between the reference and current pictures as follows: Let refPicWidthInLumaSamples and refPicHeightInLumaSamples be the pic_width_in_luma_samples and pic_height_in_luma_samples, respectively, of a reference picture of a current picture referring to this PPS. There may be a requirement of bitstream conformance that all of the following conditions are satisfied:

pic_width_in_luma_samples*2 shall be greater than or equal to refPicWidthInLumaSamples.

pic_height_in_luma_samples*2 shall be greater than or equal to refPicHeightInLumaSamples.

pic_width_in_luma_samples shall be less than or equal to refPicWidthInLumaSamples*8.

pic_height_in_luma_samples shall be less than or equal to refPicHeightInLumaSamples*8.

Since the reference picture scaling ratios are derived by the scaling window widths and heights of each regular picture, i.e., PicOutputWidthL and PicOutputHeightL, the scaling ratios could be outside the range if there is no restriction to PicOutputWidthL and PicOutputHeightL. VVC Draft 7 may be modified as described below.

Let refPicOutputWidthL and refPicOutputHeightL be the PicOutputWidthL and PicOutputHeightL, respectively, of a reference picture of a current picture referring to this PPS. There may be a requirement of bitstream conformance that all of the following conditions are satisfied:

PicOutputWidthL*A shall be greater than or equal to refPicOutputWidthL.

PicOutputHeightL*A shall be greater than or equal to refPicOutputHeightL.

PicOutputWidthL shall be less than or equal to refPicOutputWidthL*B.

PicOutputHeightL shall be less than or equal to refPicOutputHeightL*B.

where the parameters A and B could be any non-zero positive number, and B>A. One example is A=2, and B=8.

For example, video encoder 200 and video decoder 300 restrict coding according to the above conditions.

There is the same issue that the subpicture scaling ratios could be outside the range if there is no restriction to PicOutputWidthL[m] and PicOutputHeightL[m]. Therefore, video encoder 200 and video decoder 300 may be configured to apply this range to the subpicture-based scaling window widths and heights between the reference and current pictures as follows:

RefSubPicIdx is derived to be such that SubpicIdList[RefSubPicIdx] of the reference picture is equal to slice_subpic_id of the current slice header referring to the current picture. It is required that the bitstream conformance shall satisfy all of the following conditions:

PicOutputWidthL[ SubPicIdx ] * A shall be greater than or equal to PicOutputWidthL[ RefSubPicIdx ].
PicOutputHeightL[ SubPicIdx ] * A shall be greater than or equal to PicOutputHeightL[ RefSubPicIdx ].
PicOutputWidthL[ SubPicIdx ] shall be less than or equal to PicOutputWidthL[ RefSubPicIdx ] * B.
PicOutputHeightL[ SubPicIdx ] shall be less than or equal to PicOutputHeightL[ RefSubPicIdx ] * B.

where the parameters A and B could be any non-zero positive number, and B>A. One example is A=2, and B=8.

For example, video encoder 200 and video decoder 300 restrict coding according to the above conditions.

Video encoder 200 and video decoder 300 may be configured to perform integer positions derivation for interpolation filtering.

The left and top displacement should be derived to locate the top-left integer position of the current block to the top-left integer position of the reference block. There are two cases: one is the displacement between the regular pictures, and another is the displacement between the subpictures. The displacement between the subpictures is enabled only if the current subpicture is treated as a picture. U.S. Provisional Patent Application No. 62/951,709, filed on Dec. 20, 2019, and U.S. Provisional Patent Application No. 62/953,015, filed on Dec. 23, 2019, which are both hereby incorporated in their entirety by reference, address some of the issues discussed. The displacement for the regular picture is already provided in VVC as follows:

Considering the left displacement from the scaling window in the current picture to the scaling window in the reference picture, a general formula is refPos=curPos−cur_scaling_win_left_offset+ref_scaling_win_left_offset refPos: Top-left position of the scaling window in the reference subpicture curPos: Top-left position of the scaling window in the current subpicture cur_scaling_win_left_offset: scaling_win_left_offset of the current subpicture ref_scaling_win_left_offset: scaling_win_left_offset of the reference subpicture The same process may be used for the top displacement.

Video encoder 200 and video decoder 300 may be configured to determine the displacement for the subpicture as follows: Considering the left displacement from the scaling window in the current subpicture to the scaling window in the reference subpicture, a general formula is refPos=curPos−(curSubPicLeftBoundaryPos+cur_scaling_win_left_offset[SubPicIdx])+(refSubPicLeftBoundaryPos+ref_scaling_win_left_offset[RefSubPicIdx])

refPos: Top-left position of the scaling window in the reference subpicture curPos: Top-left position of the scaling window in the current subpicture curSubPicLeftBoundaryPos: the boundary left position in the current subpicture, i.e., SubPicLeftBoundaryPos derived in the current subpicture refSubPicLeftBoundaryPos: the boundary left position in the reference subpicture, i.e., SubPicLeftBoundaryPos derived in the reference subpicture cur_scaling_win_left_offset[SubPicIdx]: scaling_win_left_offset[SubPicIdx] of the current subpicture ref_scaling_win_left_offset[RefSubPicIdx]: scaling_win_left_offset[RefSubPicIdx] of the reference subpicture The same process may be used for the top displacement.

Syntax changes to VVC Draft 7 are shown in the following table. The beginning of additions are marked <ADD> and the end of additions are marked </ADD>.

<ADD>If subpic_treated_as_pic_flag[ SubPicIdx ] is equal to 1, the following applies
  leftBoundaryOffset = SubPicLeftBoundaryPos + subpic_scaling_win_left_offset[ SubPicIdx ]
  topBoundaryOffset = SubPicTopBoundaryPos + subpic_scaling_win_top_offset[ SubPicIdx ]
  RefSubPicIdx is derived to be such that SubpicIdList[ RefSubPicIdx ] of the reference picutre is equal to slice_subpic_id.
  refSubPicLeftBoundaryPos = subpic_ctu_top_left_x[ RefSubPicIdx ] * CtbSizeY
  refSubPicTopBoundaryPos = subpic_ctu_top_left_y[ RefSubPicIdx ] *CtbSizeY </ADD>
  The variable fRefLeftOffset is set equal to (<ADD>( subpic_</ADD>scaling_win_left_offset<ADD>[ RefSubPicIdx ] + refSubPicLeftBoundaryPos) </ADD> << 10), where
<ADD>subpic_</ADD>scaling_win_left_offset<ADD>[ i ] </ADD> is the

```
            <ADD>subpic_</ADD>scaling_win_left_offset<ADD>[ i ]</ADD> for the
        reference picture.
                The variable fRefTopOffset is set equal to
        (<ADD>( subpic_</ADD>scaling_win_top_offset<ADD>[ RefSubPicIdx ] +
        refSubPicTopBoundaryPos) </ADD> << 10), where
        <ADD>subpic_</ADD>scaling_win_top_offset<ADD>[ i ] </ADD> is the
        <ADD>subpic_</ADD>scaling_win_top_offset<ADD>[ i ] </ADD> for the
        reference picture.
        <ADD> Else
                leftBoundaryOffset = scaling_win_left_offset
                topBoundaryOffset = scaling_win_top_offset </ADD>
                The variable fRefLeftOffset is set equal to
        (scaling_win_left_offset << 10 ), where scaling_win_left_offset is the
        scaling_win_left_offset for the reference picture.
                The variable fRefTopOffset is set equal to
        (scaling_win_top_offset << 10 ), where scaling_win_top_offset is the
        scaling_win_top_offset_for the reference picture.
        ...
- If cIdx is equal to 0, the following applies:
    - For each luma sample location
        ( $x_L$ = 0..sbWidth − 1 + brdExtSize, $y_L$ = 0..sbHeight − 1 + brdExtSize )
        inside the prediction luma sample array predSamplesLX, the corresponding
        prediction luma sample value predSamplesLX[$x_L$ ][ $y_L$ ] is derived as follows:
        - Let ( refxSb$_L$, refySb$_L$ ) and ( refx$_L$, refy$_L$ ) be luma locations pointed to by
          a motion vector ( refMvLX[0], refMvLX[1] ) given in 1/16-sample units.
          The variables refxSb$_L$, refx$_L$, refySb$_L$, and refy$_L$ are derived as follows:
            refxSb$_L$ = ( ( ( xSb − <ADD> leftBoundaryOffset
            </ADD> ) << 4 ) + refMvLX[ 0 ] ) * scalingRatio[ 0 ]          (937)
            refx$_L$ = ( ( Sign( refxSb$_L$ ) * ( ( Abs( refxSb$_L$ ) + 128 ) >> 8 )
                + x$_L$ * ( ( scalingRatio[ 0 ] + 8) >> 4 ) ) + fRefLeftOffset + 32 ) >>
            6(938)
            refySb$_L$ = ( ( ( ySb − <ADD> topBoundaryOffset </ADD> ) <<
            4 ) + refMvLX[ 1 ] ) * scalingRatio[ 1 ]                      (939)
            refy$_L$ = ( ( Sign( refySb$_L$ ) * ( ( Abs( refySb$_L$ ) + 128 ) >> 8 ) + yL *
                (( scalingRatio[ 1 ] + 8) >> 4 ) ) + fRefTopOffset + 32 ) >> 6
            (940)
```

The techniques discussed in this disclosure may be used separately or in any combination. For example, the following three examples may be used separately or in any combination.

According to a first example, a reference picture and a current picture may be the same size. The scaling ratios are enabled for a current subpicture to scale the size of the reference subpicture to the size of the current subpicture, as in the example of FIG. 3 for instance. For example, video encoder 200 and video decoder 300 may scale the size of the reference subpicture to the size of the current subpicture.

According to a second example, video encoder 200 and video decoder 300 may be configured to support a scaling process, where the reference picture and the current picture are different sizes, and the subpicture ID remains unchanged in CLVS. In FIG. 8, current picture 180 includes subpictures with IDs 1, 2, and 3, and reference picture 182 also includes subpictures with IDs 1, 2, and 3. FIG. 8 shows an example where current picture 180 and reference picture 182 are different sizes, but the reference picture IDs remain the same. In such an example, video encoder 200 and video decoder 300 may not change the subpicture ID.

According to a third example, video encoder 200 and video decoder 300 may be configured to support a scaling process where the reference picture and the current picture are different sizes, and the subpicture ID changes in CLVS. In FIG. 9, current picture 190 includes subpictures with IDs 1, 2, and 3, and reference picture 192 also includes subpictures with IDs 1, 2, and 3. FIG. 9 shows an example where current picture 190 and reference picture 192 are different sizes, and the reference picture IDs have changed. In such an example, video encoder 200 and video decoder 300 may change the subpicture ID.

Figure 10:
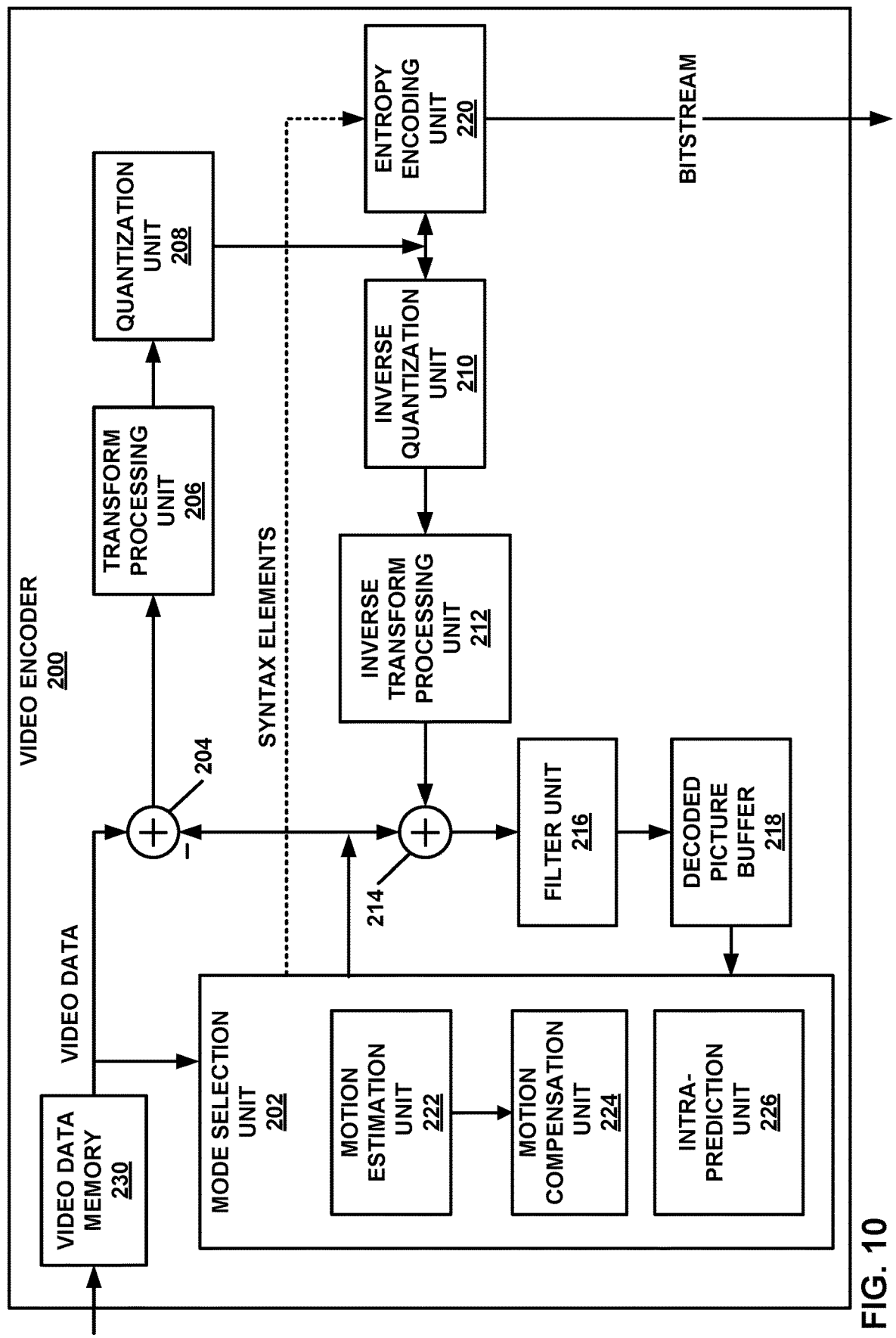
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging. As explained above, when inter predicting a block of a current subpicture from a reference subpicture with a different resolution, motion estimation unit 222 and motion compensation unit 224 may, for example, scale a prediction block from the reference subpicture based on scaling parameters for the current subpicture. Motion estimation unit 222 and motion compensation unit 224 may, for example, determine a scaling ratio using scaling windows in accordance with the techniques described above.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 11:
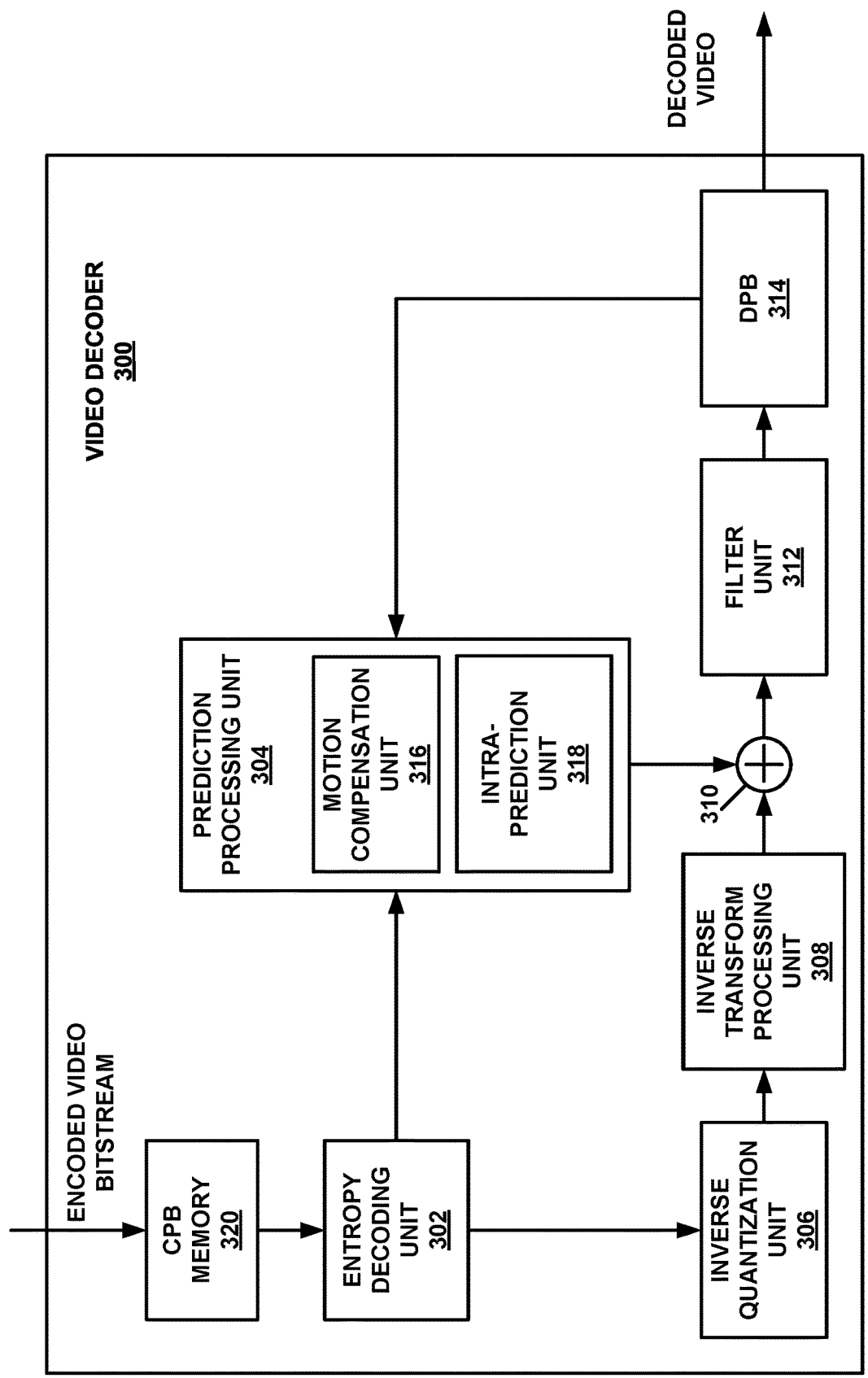
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10). As explained above, when inter predicting a block of a current subpicture from a reference subpicture with a different resolution, motion compensation unit 316 may, for example, scale a prediction block from the reference subpicture based on scaling parameters for the current subpicture. Motion compensation unit 316 may, for example, determine a scaling ratio using scaling windows in accordance with the techniques described above.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 12:
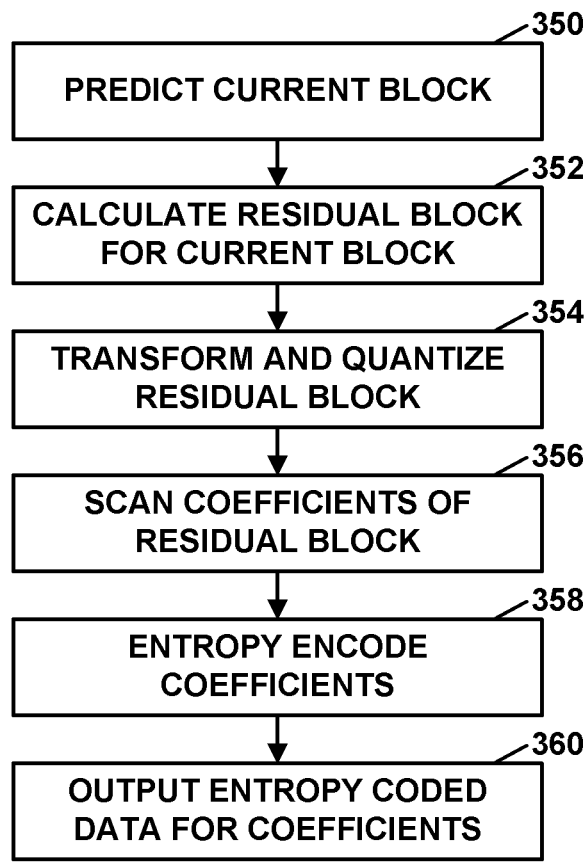
FIG. 12 is a flowchart illustrating an example process for encoding a current block of video data.

FIG. 12 is a flowchart illustrating an example process for encoding a current block. The current block may comprise a current CU. Although described with respect to video encoder 200 (FIGS. 1 and 7), it should be understood that other devices may be configured to perform a method similar to that of FIG. 6.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 13:
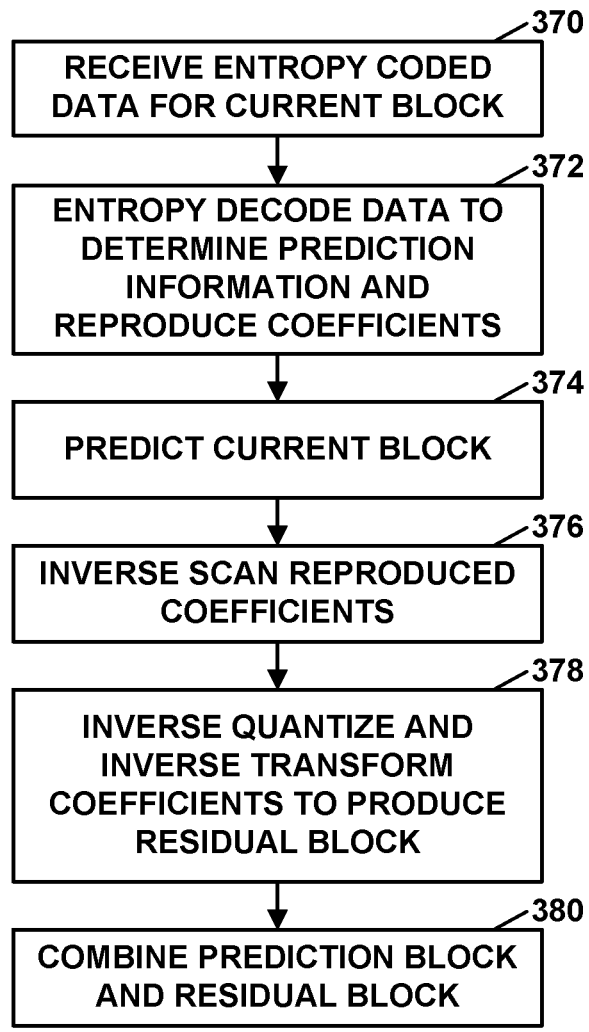
FIG. 13 is a flowchart illustrating an example process for decoding a current block of video data.

FIG. 13 is a flowchart illustrating an example process for decoding a current block of video data. The current block may comprise a current CU. Although described with respect to video decoder 300 (FIGS. 1 and 8), it should be understood that other devices may be configured to perform a method similar to that of FIG. 13.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 14:
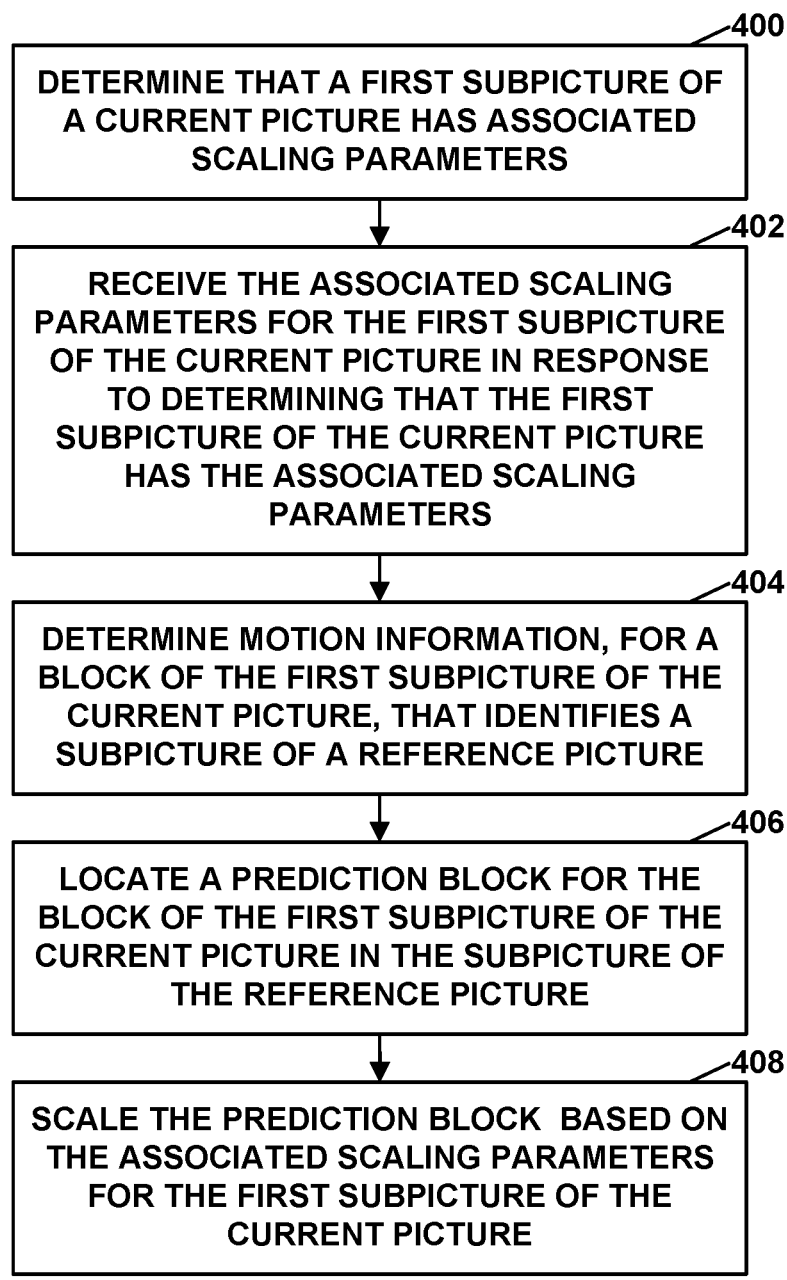
FIG. 14 is a flowchart illustrating an example process for coding a current block of video data.

FIG. 14 is a flowchart illustrating an example process for coding a current block of video data. The current block may comprise a current CU. The techniques of FIG. 14 will be described with respect to a generic video coder, such as video encoder 200 (FIGS. 1 and 7) or video decoder 300 (FIGS. 1 and 8). It should be understood, however, that other devices may be configured to perform a process similar to that of FIG. 14.

The video coder determines that a first subpicture of a current picture has associated scaling parameters (400). The video coder may, for example, determine that the first subpicture of the current picture has the associated scaling parameters by receiving, in a parameter set data structure for the current picture, a first instance of a first syntax element indicating if the first subpicture of the current picture has the associated scaling parameters. The parameter set data structure may, for example, be a picture header, PPS, or other such parameter set data structure.

The video coder receives the associated scaling parameters for the first subpicture of the current picture in response to determining that the first subpicture of the current picture has the associated scaling parameters (402). To receive the associated scaling parameters for the first subpicture, the video coder may be configured to receive the associated scaling parameters for the first subpicture in a parameter set data structure. The parameter set data structure may, for example, be a picture header, PPS, or other such parameter set data structure. The video coder may be further configured to receive a second syntax element that indicates a number of subpictures in the current picture; receive, for each subpicture of the subpictures in the current picture, an instance of the first syntax element indicating if the respective subpicture of the current picture has associated scaling parameters; and for each respective subpicture that has associated scaling parameters, receive the associated scaling parameters.

The associated scaling parameters may, for example, include one or more of a left offset value that specifiues an offset, in units of luma samples, between a left boundary of the first subpicture and a left boundary of the scaling window in the first subpicture; a right offset value that specifiues an offset, in units of the luma samples, between a right boundary of the first subpicture and a right boundary of the scaling window in the first subpicture; a top offset value that specifiues an offset, in the units of luma samples, between a top boundary of the first subpicture and a top boundary of the scaling window in the first subpicture; and a bottom offset value that specifiues an offset, in the units of luma samples, between a bottom boundary of the first subpicture and a bottom boundary of the scaling window in the first subpicture. The associated scaling parameters may, for example, include one or more of the pps_scaling_win_left_offset[i], pps_scaling_win_right_offset[i], pps_scaling_win_top_offset[i], and pps_scaling_win_bottom_offset[i] syntax elements described above.

The video coder determines motion information, for a block of the first subpicture of the current picture, that identifies a subpicture of a reference picture (404). The motion information may, for example, include one or more of a motion vector, a reference picture index, or a motion vector resolution. The video coder may use the motion information to inter predict a block as described above. The video coder locates a prediction block for the block of the first subpicture of the current picture in the subpicture of the reference picture (406).

The video coder scales the prediction block based on the associated scaling parameters for the first subpicture of the current picture (408). To scale the prediction block based on the associated scaling parameters for the first subpicture, the video coder may, for example, determine a window of the subpicture of the reference picture based on the associated scaling parameters for the first subpicture, wherein the window of the subpicture of the reference picture comprises less than all of the subpicture of the reference picture; determine a window of the first subpicture of the current picture based on the associated scaling parameters for the first subpicture, wherein the window of the first subpicture of the current picture comprises less than all of the first subpicture of the current picture; determine a scaling ratio based on a ratio of the window of the subpicture of the reference picture and the window of the first subpicture of the current picture; and scale the prediction block based on the determined scaling ratio. To scale the subpicture of the reference picture based on the associated scaling parameters for the first subpicture, the video coder may, for example, determine a scaling window in the first subpicture based on the associated scaling parameters for the first subpicture; determine a ratio of a height of the scaling window in the first subpicture to a height of a scaling window in the subpicture of the reference picture; determine a ratio of a width of the scaling window in the first subpicture to a width of the scaling window in the subpicture of the reference picture; and scale the prediction block based on the ratio of the height of the scaling window in the first subpicture to the height of the scaling window in the subpicture of the reference picture and the ratio of the width of the scaling window in the first subpicture to the width of the scaling window in the subpicture of the reference picture. The determined scaling ratio is in the range of 1/8 to 2, inclusive. A resolution of the scaled prediction block may be equal to a resolution of the block of the first subpicture of the current picture.

The video coder may output decoded video data based on the scaled prediction block. The video coder may, for example, add residual data to the scaled prediction block to form a reconstructed block and output the reconstructed block, possibly after applying one or more filter operations. When the video coder is encoding the video data, the video coder may output the decoded video by storing the decoded video data to use when encoding subsequent blocks or subsequent pictures. When the video coder is decoding the video data, the video coder may output the decoded video by storing the decoded video data to use when decoding subsequent blocks or subsequent pictures or output the decoded video for display.

Clause 1: A method of coding video data includes determining if a subpicture of the video data is to be treated as a picture; based on the subpicture being treated as a picture, scaling the subpicture as a picture; based on the subpicture not being treated as a picture, determining a subpicture scaling flag; and coding the subpicture based on the scaling or the subpicture scaling flag.

Clause 2: The method of clause 1, wherein the subpicture scaling flag is signaled in a picture parameter set (PPS).

Clause 3: The method of any combination of clauses 1-2, wherein the subpicture scaling flag is inferred to be 0 if: is equal to 0; ref_pic_resampling_enabled_flag is equal to 0 and sps_subpic_id_present_flag is equal to 0; ref_pic_resampling_enabled_flag is equal to 0 and sps_subpic_id_signalling_present_flag is equal to 1; or is equal to 1 and subpic_treated_as_pic_flag[i] is equal to 0.

Clause 4: The method of any combination of clauses 1-3, further includes determining subpicture scaling window parameters.

Clause 5: The method of clause 4, wherein the subpicture scaling window parameters are signaled in the PPS.

Clause 6: The method of any combination of clauses 4-5, wherein the subpicture scaling window parameters are signaled in the picture header (PH).

Clause 7: A method of coding video data includes determining if a subpicture of the video data is to be treated as a picture; based on the subpicture being treated as a picture, determining a first scaling ratio; based on the subpicture not being treated as a picture, determining a second scaling ratio; and coding the subpicture based on the first scaling ratio or the second scaling ratio.

Clause 8: A method of coding video data includes restricting PicOutputWidthL*A to be greater than or equal to refPicOutputWidthL; restricting PicOutputHeightL*A to be greater than or equal to refPicOutputHeightL; restricting PicOutputWidthL to be less than or equal to refPicOutputWidthL*B; restricting PicOutputHeightL shall be less than or equal to refPicOutputHeightL*B; and coding the video data based on the restrictions, wherein A is a non-zero positive number, B is a non-zero positive number, and B>A.

Clause 9: A method of coding video data includes restricting PicOutputWidthL[SubPicIdx]*A to be greater than or equal to PicOutputWidthL[RefSubPicIdx]; restricting PicOutputHeightL[SubPicIdx]*A to be greater than or equal to PicOutputHeightL[RefSubPicIdx]; restricting PicOutputWidthL[SubPicIdx] to be less than or equal to PicOutputWidthL[RefSubPicIdx]*B; restricting PicOutputHeightL[SubPicIdx] to be less than or equal to PicOutputHeightL[RefSubPicIdx]*B; and coding the video data based on the restrictions, wherein A is a non-zero positive number, B is a non-zero positive number, and B>A.

Clause 10: A method of coding video data includes determining a left displacement from a scaling window in a current subpicture of the video data to a scaling window in a reference subpicture in the video data; determining a top displacement from a scaling window in the current subpicture to a scaling window in the reference subpicture; and coding the current subpicture based on the left displacement and the top displacement.

Clause 11: The method of any of clauses 1-10, wherein a reference picture and a current picture are a same size and scaling ratios are enabled for a current subpicture to scale a size of a reference subpicture to a size of a current subpicture.

Clause 12: The method of any of clauses 1-11, wherein a reference picture and a current picture are different sizes, and a subpicture ID remains unchanged in a coded layer-wise video sequence (CLVS).

Clause 13: The method of any of clauses 1-12, wherein a reference picture and a current picture are different sizes, and a subpicture ID changes in a CLVS.

Clause 14: The method of any of clauses 1-13, wherein coding comprises decoding.

Clause 15: The method of any of clauses 1-14, wherein coding comprises encoding.

Clause 16: A device for coding video data, the device comprising one or more means for performing the method of any of clauses 1-15.

Clause 17: The device of clause 16, wherein the one or more means comprise one or more processors implemented in circuitry.

Clause 18: The device of any of clauses 16 and 17, further comprising a memory to store the video data.

Clause 19: The device of any of clauses 16-18, further comprising a display configured to display decoded video data.

Clause 20: The device of any of clauses 16-19, wherein the device comprises one or more of a camera, a computer, a mobile device, a broadcast receiver device, or a set-top box.

Clause 21: The device of any of clauses 16-20, wherein the device comprises a video decoder.

Clause 22: The device of any of clauses 16-21, wherein the device comprises a video encoder.

Clause 23: A computer-readable storage medium having stored thereon instructions that, when executed, cause one or more processors to perform the method of any of clauses 1-15.

Clause 24: A device for encoding video data includes means for performing any of the methods of this disclosure.

Clause 25: A method of coding video data includes identifying a subpicture of a reference picture that corresponds to a subpicture of a current picture; scaling the subpicture of the reference picture; and coding a block of the subpicture of the current picture based on the scaled subpicture of the reference picture.

Clause 26: The method of clause 25, wherein a resolution of the scaled subpicture of the reference picture is equal to a resolution of the subpicture of the current picture.

Clause 27: The method of clause 25 or 26 wherein scaling the subpicture of the reference picture comprises determining a scaling window in the subpicture of the reference picture.

Clause 28: The method of any of clauses 25-27, wherein coding comprises decoding.

Clause 29: The method of any of clauses 25-27, wherein coding comprises encoding.

Clause 30: A device for coding video data, the device comprising one or more means for performing the method of any of clauses 25-29.

Clause 31: The device of clause 30, wherein the one or more means comprise one or more processors implemented in circuitry.

Clause 32: The device of any of clauses 30 and 32, further comprising a memory to store the video data.

Clause 33: The device of any of clauses 30-32, further comprising a display configured to display decoded video data.

Clause 34: The device of any of clauses 30-33, wherein the device comprises one or more of a camera, a computer, a mobile device, a broadcast receiver device, or a set-top box.

Clause 35: The device of any of clauses 30-34, wherein the device comprises a video decoder.

Clause 36: The device of any of clauses 30-34, wherein the device comprises a video encoder.

Clause 37: A computer-readable storage medium having stored thereon instructions that, when executed, cause one or more processors to perform the method of any of clauses 25-29.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising: determining that a first subpicture of a current picture has associated scaling parameters, wherein the current picture comprises a plurality of subpictures that includes the first subpicture; in response to determining that the first subpicture of the current picture has the associated scaling parameters, receiving the associated scaling parameters for the first subpicture of the current picture; determining motion information for a block of the first subpicture of the current picture, wherein the motion information identifies a subpicture of a reference picture; locating a prediction block for the block of the first subpicture of the current picture in the subpicture of the reference picture; and scaling the prediction block based on the associated scaling parameters for the first subpicture of the current picture.

2. The method of claim 1, wherein: determining that the first subpicture of the current picture has the associated scaling parameters comprises receiving, in a parameter set data structure for the current picture, a first instance of a first syntax element indicating if the first subpicture of the current picture has the associated scaling parameters; and receiving the associated scaling parameters for the first subpicture comprises receiving the associated scaling parameters for the first subpicture in the parameter set data structure.

3. The method of claim 1, wherein scaling the prediction block based on the associated scaling parameters for the first subpicture comprises: determining a window of the subpicture of the reference picture based on the associated scaling parameters for the first subpicture, wherein the window of the subpicture of the reference picture comprises less than all of the subpicture of the reference picture; determining a window of the first subpicture of the current picture based on the associated scaling parameters for the first subpicture, wherein the window of the first subpicture, of the current picture comprises less than all of the first subpicture of the current picture; determining a scaling ratio based on a ratio of the window of the subpicture of the reference picture and the window of the first subpicture of the current picture; and scaling the prediction block based on the determined scaling ratio.

4. The method of claim 3, wherein the determined scaling ratio is in the range of 1/8 to 2, inclusive.

5. The method of claim 1, wherein a resolution of the scaled prediction block is equal to a resolution of the block of the first subpicture of the current picture.

6. The method of claim 1, further comprising: receiving a second syntax element that indicates a number of subpictures in the plurality of subpictures; receiving, for each subpicture of the plurality of subpictures in the current picture, an instance of the first syntax element indicating whether the respective subpicture of the current picture has associated scaling parameters; and for each respective subpicture that has associated scaling parameters, receiving the associated scaling parameters.

7. The method of claim 1, wherein scaling the subpicture of the reference picture based on the associated scaling parameters for the first subpicture comprises: determining a scaling window in the first subpicture based on the associated scaling parameters for the first subpicture; determining a ratio of a height of the scaling window in the first subpicture to a height of a scaling window in the subpicture of the reference picture; determining a ratio of a width of the scaling window in the first subpicture to a width of the scaling window in the subpicture of the reference picture; scaling the prediction block based on the ratio of the height of the scaling window in the first subpicture to the height of the scaling window in the subpicture of the reference picture and the ratio of the width of the scaling window in the first subpicture to the width of the scaling window in the subpicture of the reference picture.

8. The method of claim 1, wherein the associated scaling parameters comprise: a left offset value that specifies an offset, in units of luma samples, between a left boundary of the first subpicture and a left boundary of the scaling window in the first subpicture; a right offset value that specifies an offset, in units of the luma samples, between a right boundary of the first subpicture and a right boundary of the scaling window in the first subpicture; a top offset value that specifies an offset, in the units of luma samples, between a top boundary of the first subpicture and a top boundary of the scaling window in the first subpicture; and a bottom offset value that specifies an offset, in the units of luma samples, between a bottom boundary of the first subpicture and a bottom boundary of the scaling window in the first subpicture.

9. The method of claim 1, wherein the method of coding the video data comprises a method of encoding the video data.

10. The method of claim 1, wherein the method of coding the video data comprises a method of decoding the video data.

11. A device for decoding video data, the device comprising: a memory configured to store video data: one or more processors implemented in circuitry and configured to: determine that a first subpicture of a current picture has associated scaling parameters, wherein the current picture comprises a plurality of subpictures that includes the first subpicture: in response to determining that the first subpicture of the current picture has the associated scaling parameters, receive the associated scaling parameters for the first subpicture of the current picture; determine motion information for a block of the first subpicture of the current picture, wherein the motion information identifies a subpicture of a reference picture; locate a prediction block for the block of the first subpicture of the current picture in the subpicture of the reference picture; and scale the prediction block based on the associated scaling parameters for the first subpicture of the current picture.

12. The device of claim 11, wherein: to determine that the first subpicture of the current picture has the associated scaling parameters, the one or more processors are further configured to receive, in a parameter set data structure for the current picture, a first instance of a first syntax element indicating if the first subpicture of the current picture has the associated scaling parameters; and to receive the associated scaling parameters for the first subpicture, the one or more processors are further configured to receive the associated scaling parameters for the first subpicture in the parameter set data structure.

13. The device of claim 11, wherein to scale the prediction block based on the associated scaling parameters for the first subpicture, the one or more processors are further configured to: determine a window of the subpicture of the reference picture based on the associated scaling parameters for the first subpicture, wherein the window of the subpicture of the reference picture comprises less than all of the subpicture of the reference picture; determine a window of the first subpicture of the current picture based on the associated scaling parameters for the first subpicture, wherein the window of the first subpicture of the current picture comprises less than all of the first subpicture of the current picture; determine a scaling ratio based on a ratio of the window of the subpicture of the reference picture and the window of the first subpicture of the current picture; and scale the prediction block based on the determined scaling ratio.

14. The device of claim 11, wherein the determined scaling ratio is in the range of 1/8 to 2, inclusive.

15. The device of claim 11, wherein a resolution of the scaled prediction block is equal to a resolution of the block of the first subpicture of the current picture.

16. The device of claim 15, wherein the one or more processors are further configured to: receive a second syntax element that indicates a number of subpictures in the plurality of subpictures; receive, for each subpicture of the plurality of subpictures in the current picture, an instance of the first syntax element indicating whether the respective subpicture of the current picture has associated scaling parameters; and for each respective subpicture that has associated scaling parameters, receive the associated scaling parameters.

17. The device of claim 11, wherein to scale the subpicture of the reference picture based on the associated scaling parameters for the first subpicture, the one or more processors are further configured to: determine a scaling window in the first subpicture based on the associated scaling parameters for the first subpicture; determine a ratio of a height of the scaling window in the first subpicture to a height of a scaling window in the subpicture of the reference picture; determine a ratio of a width of the scaling window in the first subpicture to a width of the scaling window in the subpicture of the reference picture; and scale the prediction block based on the ratio of the height of the scaling window in the first subpicture to the height of the scaling window in the subpicture of the reference picture and the ratio of the width of the scaling window in the first subpicture to the width of the scaling window in the subpicture of the reference picture.

18. The device of claim 11, wherein the associated scaling parameters comprise: a left offset value that specifies an offset, in units of luma samples, between a left boundary of the first subpicture and a left boundary of the scaling window in the first subpicture: a right offset value that specifies an offset, in units of the luma samples, between a right boundary of the first subpicture and a right boundary of the scaling window in the first subpicture; a top offset value that specifies an offset, in the units of luma samples, between a top boundary of the first subpicture and a top boundary of the scaling window in the first subpicture; and a bottom offset value that specifies an offset, in the units of luma samples, between a bottom boundary of the first subpicture and a bottom boundary of the scaling window in the first subpicture.

19. The device of claim 11, wherein the device comprises a wireless communication device, further comprising a receiver configured to receive encoded video data.

20. The device of claim 19, wherein the wireless communication device comprises a telephone handset and wherein the receiver is configured to demodulate, according to a wireless communication standard, a signal comprising the encoded video data.

21. The device of claim 11, further comprising: a display configured to display decoded video data.

22. The device of claim 11, wherein the device comprises a wireless communication device a transmitter configured to modulate, according to a wireless communication standard, a signal comprising the encoded video data.

23. The device of claim 11, further comprising: a camera configured to capture the video data.

24. A non-transitory computer-readable storage medium storing instructions that when executed by one or more processors cause the one or more processors to: determine that a first subpicture of a current picture has associated scaling parameters, wherein the current picture comprises a plurality of subpictures that includes the first subpicture; in response to determining that the first subpicture of the current picture has the associated scaling parameters, receive the associated scaling parameters for the first subpicture of the current picture; determine motion information for a block of the first subpicture of the current picture, wherein the motion information identifies a subpicture of a reference picture: locate a prediction block for the block of the first subpicture of the current picture in the subpicture of the reference picture; and scale the prediction block based on the associated scaling parameters for the first subpicture of the current picture.

25. The non-transitory computer-readable storage medium of claim 24, wherein: to determine that the first subpicture of the current picture has the associated scaling parameters, the instructions cause the one or more processors to receive, in a parameter set data structure for the current picture, a first instance of a first syntax element indicating if the first subpicture of the current picture has the associated scaling parameters; and to receive the associated scaling parameters for the first subpicture comprises receiving the associated scaling parameters for the first subpicture in the parameter set data structure.

26. The non-transitory computer-readable storage medium of claim 24, wherein to scale the prediction block based on the associated scaling parameters for the first subpicture, the one or more processors are further configured to: determine a window of the subpicture of the reference picture based on the associated scaling parameters for the first subpicture, wherein the window of the subpicture of the reference picture comprises less than all of the subpicture of the reference picture; determine a window of the first subpicture of the current picture based on the associated scaling parameters for the first subpicture, wherein the window of the first subpicture of the current picture comprises less than all of the first subpicture of the current picture; determine a scaling ratio based on a ratio of the window of the subpicture of the reference picture and the window of the first subpicture of the current picture; and scale the prediction block based on the determined scaling ratio.

27. The non-transitory computer-readable storage medium of claim 24, wherein a resolution of the scaled prediction block is equal to a resolution of the block of the first subpicture of the current picture.

28. The non-transitory computer-readable storage medium of claim 27, wherein the instructions cause the one or more processors to: receive a second syntax element that indicates a number of subpictures in the plurality of subpictures; receive, for each subpicture of the plurality of subpictures in the current picture, an instance of the first syntax element indicating whether the respective subpicture of the current picture has associated scaling parameters; and for each respective subpicture that has associated scaling parameters, receive the associated scaling parameters.

29. The non-transitory computer-readable storage medium of claim 24, wherein to scale the subpicture of the reference picture based on the associated scaling parameters for the first subpicture, the instructions cause the one or more processors: determine a scaling window in the first subpicture based on the associated scaling parameters for the first subpicture; determine a ratio of a height of the scaling window in the first subpicture to a height of a scaling window in the subpicture of the reference picture; determine a ratio of a width of the scaling window in the first subpicture to a width of the scaling window in the subpicture of the reference picture; scale the prediction block based on the ratio of the height of the scaling window in the first subpicture to the height of the scaling window in the subpicture of the reference picture and the ratio of the width of the scaling window in the first subpicture to the width of the scaling window in the subpicture of the reference picture.

30. The non-transitory computer-readable storage medium of claim 24, wherein the associated scaling parameters comprise: a left offset value that specifies an offset, in units of luma samples, between a left boundary of the first subpicture and a left boundary of the scaling window in the first subpicture; a right offset value that specifies an offset, in units of the luma samples, between a right boundary of the first subpicture and a right boundary of the scaling window in the first subpicture; a top offset value that specifies an offset, in the units of luma samples, between a top boundary of the first subpicture and a top boundary of the scaling window in the first subpicture; and a bottom offset value that specifies an offset, in the units of luma samples, between a bottom boundary of the first subpicture and a bottom boundary of the scaling window in the first subpicture.

* * * * *